US007748714B2

(12) United States Patent
Nicely et al.

(10) Patent No.: US 7,748,714 B2
(45) Date of Patent: Jul. 6, 2010

(54) CASINO CARD GAME

(75) Inventors: Mark C. Nicely, Daly City, CA (US); Ernie M. Lafky, San Francisco, CA (US); Paul E. Parker, Sunnyvale, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/304,516

(22) Filed: Dec. 14, 2005

(65) Prior Publication Data

US 2006/0131810 A1 Jun. 22, 2006

Related U.S. Application Data

(60) Provisional application No. 60/635,912, filed on Dec. 14, 2004.

(51) Int. Cl.
*A63F 1/00* (2006.01)
*A63F 9/24* (2006.01)
*G06F 19/00* (2006.01)

(52) U.S. Cl. .............................. 273/292; 463/9; 463/13; 463/23; 273/138.1

(58) Field of Classification Search ..................... 463/1, 463/11-13, 16-20, 42, 43; 273/292, 138.1, 273/148 R
See application file for complete search history.

(56) References Cited

U.S. PATENT DOCUMENTS

| | | | |
|---|---|---|---|
| 5,046,736 A | 9/1991 | Bridgeman et al. | |
| 5,788,240 A * | 8/1998 | Feinberg | 273/274 |
| 5,823,873 A | 10/1998 | Moody | |
| 6,007,066 A | 12/1999 | Moody | |
| 6,098,985 A | 8/2000 | Moody | |
| 6,110,040 A | 8/2000 | Sanduski et al. | |
| 6,196,918 B1 | 3/2001 | Miers et al. | |
| 6,652,377 B1 | 11/2003 | Moody | |
| 6,685,560 B1 | 2/2004 | Hughes | |
| 6,695,695 B2 | 2/2004 | Angel | |
| 6,749,500 B1 | 6/2004 | Nelson et al. | |
| 6,955,356 B2 | 10/2005 | Moody | |
| 6,964,418 B2 | 11/2005 | Moody | |
| 7,137,628 B2 | 11/2006 | Moody | |
| 7,165,770 B2 | 1/2007 | Snow | |
| 7,222,857 B2 | 5/2007 | Moody | |
| 2003/0003997 A1 * | 1/2003 | Vuong et al. | 463/42 |

OTHER PUBLICATIONS

Scarne, John. Scarne's Encyclopedia of Card Games. New York: HarperCollins Publishers, Inc., 1983. (p. 43 and 44).*

Billings, Darse, Denis Papp, Jonathan Schaeffer, and Duane Szafron. "Poker as a Testbed for Machine Intelligence Research." Jan. 13, 1998. Web.31 Jul. 2009. <http://www.cs.ualberta.ca/~jonathan/Papers/Papers/ai98.poker.html>.*

* cited by examiner

*Primary Examiner*—Dmitry Suhol
*Assistant Examiner*—Andrew Kim
(74) *Attorney, Agent, or Firm*—K&L Gates LLP

(57) ABSTRACT

A card game and method of playing the card game is disclosed. The card game is premised on the game of Texas Hold'em and pits a player against one or more virtual players. Initially, the player places a blind wager and then the player and multiple virtual players are provided two hole cards. The player's two hole cards are provided face-up and each virtual player receives the hole cards face down. In one version, at least one virtual hand is eliminated from play during the game. Elimination criteria can be based on a ranking of the virtual player's hand or other suitable criteria. At the end of the game the player's hand is compared to each remaining virtual player's hand. If the player's hand outranks each virtual player's hand, the player wins a payout. A hand swap or exchange, "All In" wager and a side wager are other features of the game.

34 Claims, 20 Drawing Sheets

| PLAYER'S HAND | BONUS AWARD |
|---|---|
| ROYAL FLUSH | 500X |
| STRAIGHT FLUSH | 100X |
| FOUR OF A KIND | 24X |
| FULL HOUSE | 5X |
| FLUSH | 4X |
| STRAIGHT | 3X |
| THREE OF A KIND | 2X |
| TWO PAIR | 1X |

901

FIG. 9

1901

(highest)

| | | |
|---|---|---|
| PAIR OF A's | A♤ | A♤ |
| PAIR OF K's | K♤ | K♤ |
| PAIR OF Q's | Q♤ | Q♤ |
| PAIR OF J's | J♤ | J♤ |
| PAIR OF T's | T♤ | T♤ |
| PAIR OF 9's | 9♤ | 9♤ |
| A/K SUITED | A♡ | K♡ |
| PAIR OF 8's | 8♤ | 8♤ |
| A/Q SUITED | A♡ | Q♡ |
| A/K UNSUITED | A♧ | K♢ |
| A/J SUITED | A♡ | J♡ |
| K/Q SUITED | K♡ | Q♡ |
| A/T SUITED | A♡ | T♡ |
| A/Q UNSUITED | A♧ | Q♢ |
| PAIR OF 7's | 7♤ | 7♤ |
| K/J SUITED | K♡ | J♡ |
| A/J UNSUITED | A♧ | J♢ |
| K/T SUITED | K♡ | T♡ |
| A/9 SUITED | A♡ | 9♡ |
| K/Q UNSUITED | K♧ | Q♢ |
| A/T UNSUITED | A♧ | T♢ |
| Q/J SUITED | Q♡ | J♡ |
| A/8 SUITED | A♡ | 8♡ |
| PAIR OF 6's | 6♤ | 6♤ |
| Q/T SUITED | Q♡ | T♡ |
| K/J UNSUITED | K♧ | J♢ |
| A/7 SUITED | A♡ | 7♡ |
| K/9 SUITED | K♡ | 9♡ |
| J/T SUITED | J♡ | T♡ |
| K/T UNSUITED | K♧ | T♢ |
| A/9 UNSUITED | A♧ | 9♢ |
| A/5 SUITED | A♡ | 5♡ |
| Q/J UNSUITED | Q♧ | J♢ |
| A/6 SUITED | A♡ | 6♡ |
| Q/9 SUITED | Q♡ | 9♡ |
| A/4 SUITED | A♡ | 4♡ |
| A/8 UNSUITED | A♧ | 8♢ |
| Q/T UNSUITED | Q♧ | T♢ |
| K/8 SUITED | K♡ | 8♡ |
| PAIR OF 5's | 5♤ | 5♤ |
| A/3 SUITED | A♡ | 3♡ |
| J/9 SUITED | J♡ | 9♡ |
| K/7 SUITED | K♡ | 7♡ |

(cont'd next column)

| | | |
|---|---|---|
| A/7 UNSUITED | A♧ | 7♢ |
| K/9 UNSUITED | K♧ | 9♢ |
| J/T UNSUITED | J♧ | T♢ |
| A/2 SUITED | A♡ | 2♡ |
| T/9 SUITED | T♡ | 9♡ |
| Q/8 SUITED | Q♡ | 8♡ |
| K/6 SUITED | K♡ | 6♡ |
| A/5 UNSUITED | A♧ | 5♢ |
| A/6 UNSUITED | A♧ | 6♢ |
| Q/9 UNSUITED | Q♧ | 9♢ |
| K/5 SUITED | K♡ | 5♡ |
| J/8 SUITED | J♡ | 8♡ |
| A/4 UNSUITED | A♧ | 4♢ |
| K/8 UNSUITED | K♧ | 8♢ |
| PAIR OF 4's | 4♤ | 4♤ |
| T/8 SUITED | T♡ | 8♡ |
| K/4 SUITED | K♡ | 4♡ |
| Q/7 SUITED | Q♡ | 7♡ |
| J/9 UNSUITED | J♧ | 9♢ |
| A/3 UNSUITED | A♧ | 3♢ |
| K/7 UNSUITED | K♧ | 7♢ |
| 9/8 SUITED | 9♡ | 8♡ |
| Q/6 SUITED | Q♡ | 6♡ |
| K/3 SUITED | K♡ | 3♡ |
| T/9 UNSUITED | T♧ | 9♢ |
| J/7 SUITED | J♡ | 7♡ |
| Q/8 UNSUITED | Q♧ | 8♢ |
| A/2 UNSUITED | A♧ | 2♢ |
| K/6 UNSUITED | K♧ | 6♢ |
| K/2 SUITED | K♡ | 2♡ |
| Q/5 SUITED | Q♡ | 5♡ |
| T/7 SUITED | T♡ | 7♡ |
| J/8 UNSUITED | J♧ | 8♢ |
| 9/7 SUITED | 9♡ | 7♡ |
| Q/4 SUITED | Q♡ | 4♡ |
| K/5 UNSUITED | K♧ | 5♢ |
| 8/7 SUITED | 8♡ | 7♡ |
| PAIR OF 3's | 3♤ | 3♤ |
| T/8 UNSUITED | T♧ | 8♢ |
| J/6 SUITED | J♡ | 6♡ |
| Q/3 SUITED | Q♡ | 3♡ |
| Q/7 UNSUITED | Q♧ | 7♢ |
| K/4 UNSUITED | K♧ | 4♢ |

(cont'd next column)

| | | |
|---|---|---|
| J/5 SUITED | J♡ | 5♡ |
| 9/8 UNSUITED | 9♧ | 8♢ |
| T/6 SUITED | T♡ | 6♡ |
| Q/2 SUITED | Q♡ | 2♡ |
| Q/6 UNSUITED | Q♧ | 6♢ |
| 9/6 SUITED | 9♡ | 6♡ |
| K/3 UNSUITED | K♧ | 3♢ |
| 8/6 SUITED | 8♡ | 6♡ |
| J/7 UNSUITED | J♧ | 7♢ |
| 7/6 SUITED | 7♡ | 6♡ |
| J/4 SUITED | J♡ | 4♡ |
| Q/5 UNSUITED | Q♧ | 5♢ |
| T/7 UNSUITED | T♧ | 7♢ |
| K/2 UNSUITED | K♧ | 2♢ |
| J/3 SUITED | J♡ | 3♡ |
| T/5 SUITED | T♡ | 5♡ |
| 9/7 UNSUITED | 9♧ | 7♢ |
| PAIR OF 2's | 2♤ | 2♤ |
| 8/7 UNSUITED | 8♧ | 7♢ |
| Q/4 UNSUITED | Q♧ | 4♢ |
| J/2 SUITED | J♡ | 2♡ |
| 6/5 SUITED | 6♡ | 5♡ |
| 9/5 SUITED | 9♡ | 5♡ |
| T/4 SUITED | T♡ | 4♡ |
| 7/5 SUITED | 7♡ | 5♡ |
| 8/5 SUITED | 8♡ | 5♡ |
| J/6 UNSUITED | J♧ | 6♢ |
| Q/3 UNSUITED | Q♧ | 3♢ |
| T/3 SUITED | T♡ | 3♡ |
| T/6 UNSUITED | T♧ | 6♢ |
| J/5 UNSUITED | J♧ | 5♢ |
| 5/4 SUITED | 5♡ | 4♡ |
| T/2 SUITED | T♡ | 2♡ |
| Q/2 UNSUITED | Q♧ | 2♢ |
| 9/6 UNSUITED | 9♧ | 6♢ |
| 6/4 SUITED | 6♡ | 4♡ |
| 8/6 UNSUITED | 8♧ | 6♢ |
| 7/6 UNSUITED | 7♧ | 6♢ |
| 9/4 SUITED | 9♡ | 4♡ |
| 7/4 SUITED | 7♡ | 4♡ |
| J/4 UNSUITED | J♧ | 4♢ |
| 8/4 SUITED | 8♡ | 4♡ |
| 9/3 SUITED | 9♡ | 3♡ |

(cont'd next column)

| | | |
|---|---|---|
| J/3 UNSUITED | J♧ | 3♢ |
| 5/3 SUITED | 5♡ | 3♡ |
| T/5 UNSUITED | T♧ | 5♢ |
| 9/2 SUITED | 9♡ | 2♡ |
| 6/5 UNSUITED | 6♧ | 5♢ |
| 6/3 SUITED | 6♡ | 3♡ |
| 9/5 UNSUITED | 9♧ | 5♢ |
| J/2 UNSUITED | J♧ | 2♢ |
| 7/5 UNSUITED | 7♧ | 5♢ |
| T/4 UNSUITED | T♧ | 4♢ |
| 4/3 SUITED | 4♡ | 3♡ |
| 8/5 UNSUITED | 8♧ | 5♢ |
| 7/3 SUITED | 7♡ | 3♡ |
| 8/3 SUITED | 8♡ | 3♡ |
| 8/2 SUITED | 8♡ | 2♡ |
| T/3 UNSUITED | T♧ | 3♢ |
| 5/2 SUITED | 5♡ | 2♡ |
| 5/4 UNSUITED | 5♧ | 4♢ |
| 6/2 SUITED | 6♡ | 2♡ |
| 6/4 UNSUITED | 6♧ | 4♢ |
| T/2 UNSUITED | T♧ | 2♢ |
| 4/2 SUITED | 4♡ | 2♡ |
| 7/2 SUITED | 7♡ | 2♡ |
| 9/4 UNSUITED | 9♧ | 4♢ |
| 7/4 UNSUITED | 7♧ | 4♢ |
| 8/4 UNSUITED | 8♧ | 4♢ |
| 9/3 UNSUITED | 9♧ | 3♢ |
| 3/2 SUITED | 3♡ | 2♡ |
| 5/3 UNSUITED | 5♧ | 3♢ |
| 9/2 UNSUITED | 9♧ | 2♢ |
| 6/3 UNSUITED | 6♧ | 3♢ |
| 4/3 UNSUITED | 4♧ | 3♢ |
| 7/3 UNSUITED | 7♧ | 3♢ |
| 8/3 UNSUITED | 8♧ | 3♢ |
| 8/2 UNSUITED | 8♧ | 2♢ |
| 5/2 UNSUITED | 5♧ | 2♢ |
| 6/2 UNSUITED | 6♧ | 2♢ |
| 4/2 UNSUITED | 4♧ | 2♢ |
| 7/2 UNSUITED | 7♧ | 2♢ |
| 3/2 UNSUITED | 3♧ | 2♢ |

(lowest)

1999

*FIG. 19*

CASINO CARD GAME

CROSS REFERENCE TO RELATED APPLICATIONS

This application claims the benefit of provisional application No. 60/635,912 filed Dec. 14, 2004.

FIELD OF THE INVENTION

The embodiments of the present invention relate to live or electronically-implemented card-based casino games. More particularly, the embodiments relate to a Texas Hold'em game that may be played by a single live player and multiple virtual players.

BACKGROUND

Poker continues to attract incredible numbers of players. The recent popularity explosion associated with poker can be credited to television and the Internet. Televised poker tournaments can now be seen on ESPN, FOX, NBC and the Travel Channel. Moreover, hundreds of online websites are dedicated to facilitating poker games between players from remote locations. Nothing better underscores the popularity of poker, especially the game of Texas Hold'em, than the increase in the number of entries for the previous three World Series of Poker final tournaments held in Las Vegas each year. In 2003 there were 839 entries; in 2004 there were 2576 entries; and in 2005 there were 5619 entries. The increase in the number of entries continues despite a sizable $10,000 entry fee.

Texas Hold'em is the most popular poker game being played today and is a multi-player card game played on a card table or via a computer-simulated card table. Texas Hold'em requires two or more players, though some computer-based models of the game implement virtual players using computer heuristics to simulate behavior akin to actual human players. However, playing Texas Hold'em at a multi-player poker table can be intimidating for new and even experienced players.

Current "player vs. casino" card games which are based on Texas Hold'em fall into several categories. One type of game has players attempting to achieve a certain hand outcome relative to a pay table wherein the game has a variety of wagering options and/or requirements. Another type of game is based on the outcome of the player's hand relative to that of the dealer's hand wherein the game has a variety of wagering options and/or requirements. Some games offer both type of mechanisms, with the main game based on latter category and an optional side wager based on the former category.

Thus, there continues to be the need for a Texas Hold'em game that may be played by a single player against a dealer or an electronic gaming device. The game should be more like the actual table game without being too intimidating to novice players.

SUMMARY

Accordingly, one embodiment of the present invention is a method of conducting a card game comprising: accepting a player wager in the form of a blind wager; providing two hole cards to the player and two or more virtual players; offering the player an option to place one or more subsequent wagers as the game progresses; eliminating at least one virtual player based on pre-established criteria; providing five face-up common cards in a pre-established manner; comparing the player's final hand against each remaining virtual player's hand, wherein the hands are formed using the best five cards selected from the two hole cards and the five common cards; and paying the player an award based on the rank of the player's final poker hand.

In general, the embodiments of the present invention include a method of conducting a casino card game with some or all of the following features:

- Accepting an initial wager from a single player (termed a blind);
- Providing two cards face up to the player and two cards face down to two or more virtual players;
- Causing at least one of the virtual players to call the blind and raise it;
- Providing the option or requirement for the player to increase his wager to continue in the game or to fold his hand, forfeit his blind and exit the game;
- Causing at least one of the virtual players to fold if this has not already happened and, if the player raised the wager, causing at least one of the virtual player to match the raise;
- Providing community cards as in Texas Hold'em, to be used by both the player and virtual player(s) to form best poker hand using five of the seven provided cards;
- After the first three community cards (the flop) and the fourth card (the turn) are provided, providing an option or requirement for the player to increase the player's wager;
- Once the last community card (the river) is revealed and wagering has ended, causing the remaining virtual player(s) reveal their hole cards; and/or
- If the player holds the highest ranking five-card hand relative to the virtual, player(s), awarding the player the pot, if the player holds a hand with a rank equal to the highest-ranking virtual hand, then splitting the pot, or else the player wins nothing.

The embodiments of the present invention cover any number of game variations including:

- The actual number of wagering opportunities;
- An optional "All In" wager before the flop wherein the player can make an especially large wager in exchange for forgoing all remaining wager opportunities.
- Whether the player is required to wager at each stage after the blind wager in order to stay in the game or whether such wagers are optional;
- The wager limits, including the required/allowable sizes of the post-blind wagers relative to the amount of the blind wager;
- Whether virtual players vary their wager behavior; and/or
- Whether the decision to eliminate a virtual player is based on the relative value of their respective two hole cards or whether it is based on the relative value of their final outcome or whether some other methodology is used.

The final two variations relate to the game's expected pay back. A game embodiment has a better pay back for the player if a virtual player adds wagers to the pot before folding. Defining how often, and to what extent the virtual player adds wagers affects the pay back. Similarly, a methodology, used with one or more embodiments of the present invention, to select which virtual player remains in the game also affects the pay back. A game defined to always maintain the virtual player with the highest-ranking final hand offers a greater pay back than a game defined to always maintain the virtual player with the highest ranking hole cards (relative to a list of two-card hand rankings) irrespective of the value and suit of the community cards. One embodiment of the present invention involves the combination of the above two approaches within a single game.

Furthermore, a specific instance of this one embodiment of the present invention operates as follows for a game having two or more virtual players. The virtual player that would achieve the highest ranking final hand and holds two hole cards above a certain threshold ranking is selected to remain in play and all other virtual players are selected to be eliminated. If no virtual player holds two hole cards above the certain threshold ranking, the virtual player with the highest-ranking two hole cards is selected to remain in the game and all other players are selected for elimination. Not only does this methodology allow for the pay back of the game to be controlled, it also reduces the likelihood that the player will lose to a virtual player holding two particularly poor hole cards.

The embodiments of the present invention also include a number of optional additional game features, namely a hand swap, hand exchange and/or side wager.

The hand swap allows the player to swap hands with one of the virtual players after the player views his two hole cards. Another variation allows the player to discard his two hole cards in exchange for two new hole cards. To compensate for the swap and/or exchange feature, other game rules may be modified as follows:

- having more than two virtual players;
- having different wagering restrictions and requirements;
- altering the wagering restrictions and requirements based on whether the player chose to swap his hand; and/or
- having the player pay a fee for the swap.

The optional side wager can be offered which pays the player based upon a final game outcome. For example, the highest ranking hand is compared against a side wager pay table. If the result matches one listed in the pay table, the player is paid the specified amount relative to his or her side wager. This side wager covers any number of variations including:

- award based on the player achieving a certain hand outcome;
- award based on the player or any virtual any player achieving a certain hand outcome;
- award based on the five community cards achieving a certain outcome;
- one or more progressive jackpot awards for certain outcome(s);
- award outcomes or additional awards based upon the winning outcome being shared by two players;
- the ability for a player to place a side wager on a specific player, including himself and/or on a virtual player; and/or
- special award based on player achieving a tie with a virtual player (either any tie or only for ties of a certain ranking threshold).

Other variations, embodiments and features of the present invention will become evident from the following detailed description, drawings and claims.

BRIEF DESCRIPTION OF THE DRAWINGS

FIG. 9 shows an example side bet pay table;

FIG. 19 shows a list of two-card ranking.

DETAILED DESCRIPTION

Figure 1:
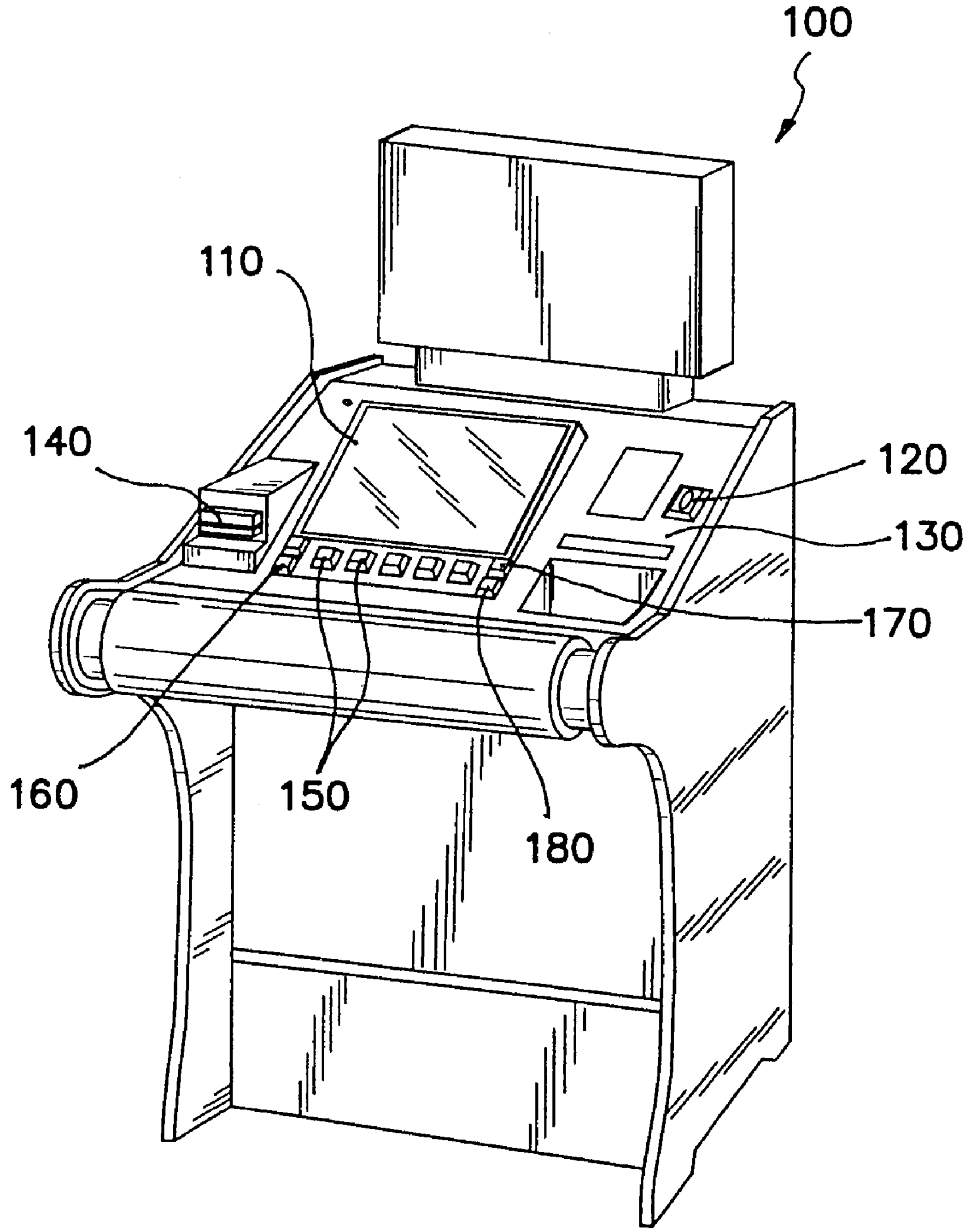
FIG. 1 shows a gaming device of the type that may be used to facilitate the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are ideal for video-based and Internet-based applications. Therefore, the following description focuses on such applications. However, it should be noted that live applications are conceivable and within the spirit and scope of the present invention. The operation of gaming devices, Internet-based applications and live table games are well known in the art and need not be explained in great detail herein. Necessary details are noted as necessary.

FIG. 1 shows an electronic gaming device 100 of the type that may facilitate the embodiments of the present invention. The device 100 includes a display 110, coin input 120, bill and/or coupon validator 130, player card reader 140, game operation buttons 150, wager buttons 160, deal button 170 and cash out button 180. Alternatively or additionally, the functions of buttons 150-180 may also be facilitated by touch screen technology. The configuration of the device 100 may be altered as long as it facilitates play of the game according to the embodiments of the resent invention.

Figure 2:
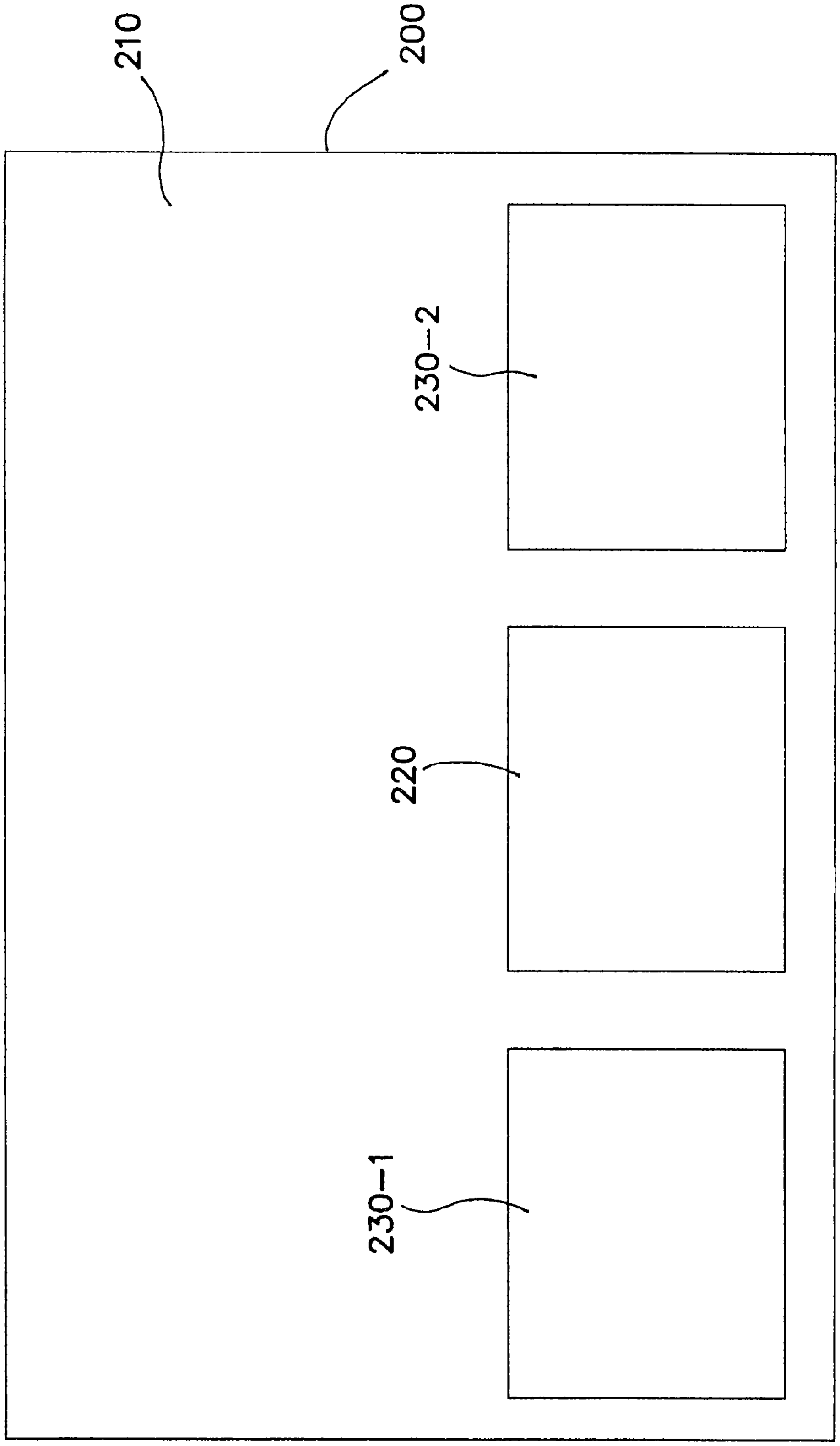
FIG. 2 shows a first screen shot of one embodiment of the present invention.

Now referring to FIG. 2, a screen 200 of the gaming device 100 displaying a layout 210 for implementing the embodiments of the present invention. The layout 210 depicts a player position 220 and multiple virtual player positions

230-1 through 230-2. To create a realistic gaming experience for the player, a simulated dealer and virtual animated players, chips and related poker room decorum may be displayed as well. Although only two virtual player positions 230-1 and 230-2 are shown, more than two may be utilized.

Figure 3:
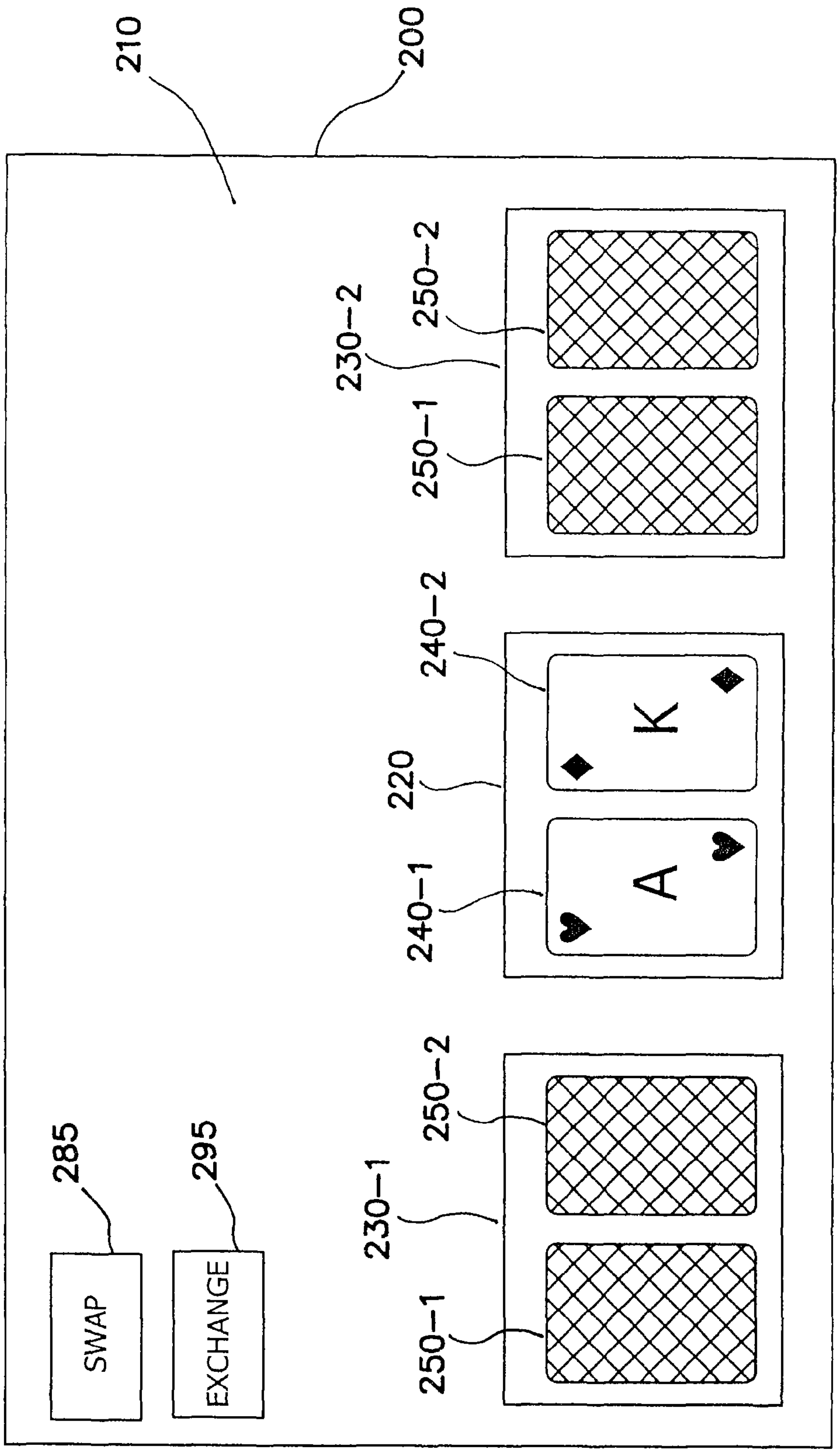
FIG. 3 shows a second screen shot of one embodiment of the present invention.
Figure 4:
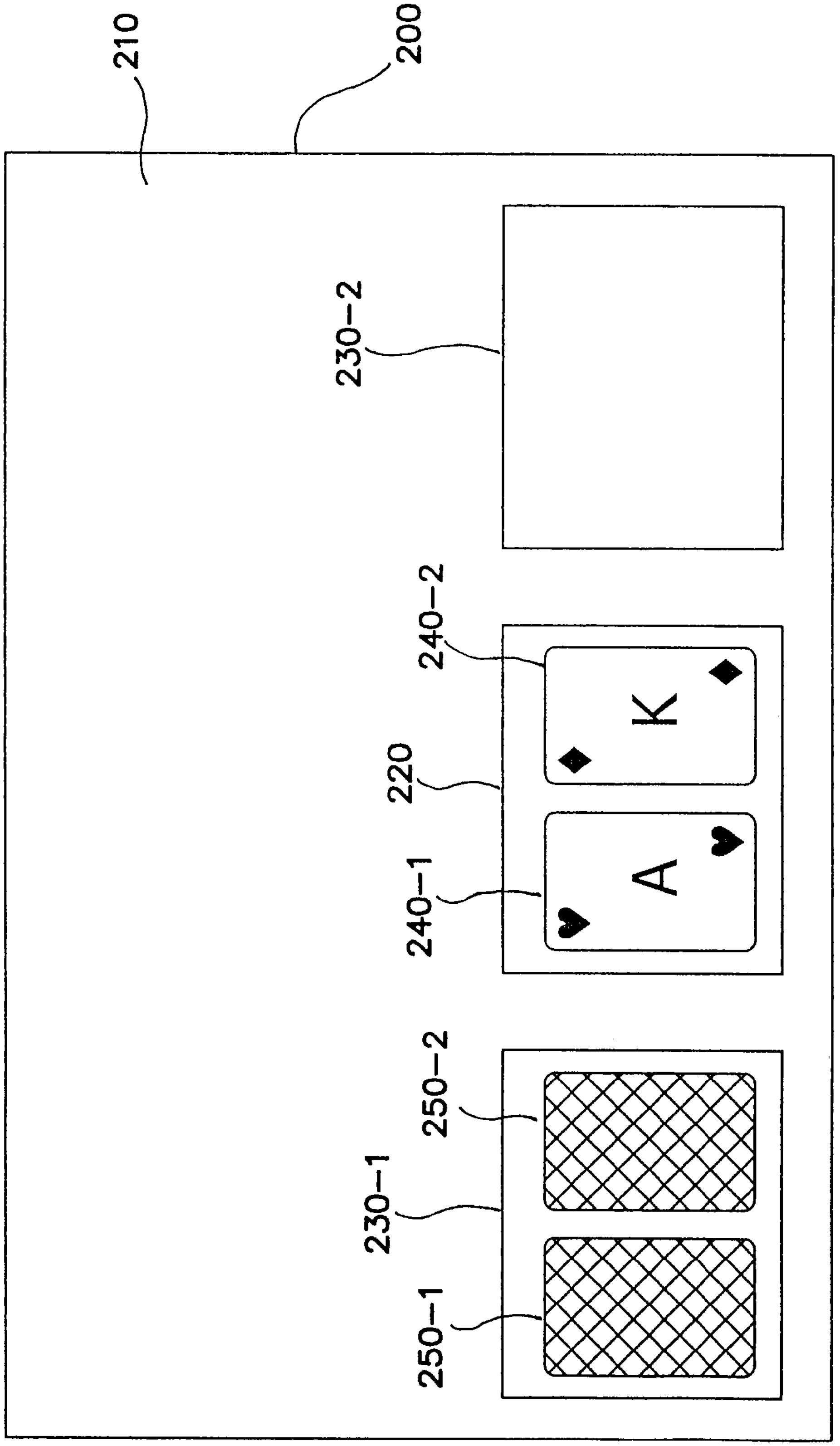
FIG. 4 shows a third screen shot of one embodiment of the present invention.

After placing an initial game wager or blind wager, and as shown in FIG. 3, the player is provided two face-up hole cards 240-1 and 240-2 and the virtual players are each provided two face-down hole cards 250-1 and 250-2. The player may now be required to, or offered the option to, place a second wager (in addition to the blind wager). Virtual player wagering action may be used to both demonstrate the player's wager requirement and to match the play dynamics of standard live Texas Hold'em. After placing the optional wager, if offered, one of the virtual hands is removed or eliminated from play. As shown in FIG. 4, the cards 250-1 and 250-2 displayed in virtual player position 130-2 have been eliminated. Removing a virtual hand can be based on any desired, pre-established criteria, including removing the virtual hand having the weakest ranking hole cards. Alternatively, the virtual hand may be removed based upon the weakest final hand ranking wherein the processor, computer or similar device looks ahead to determine the final hands even before the community cards are provided for display. Any desired and suitable criteria, including randomness, may be used to determine which of the one or more virtual hands to eliminate or remove from play. The objective of the methodology is to create a suitable house edge and reduce situations wherein players are beaten by virtual players holding very bad starting hands, commonly known as bad beats.

Figure 17:
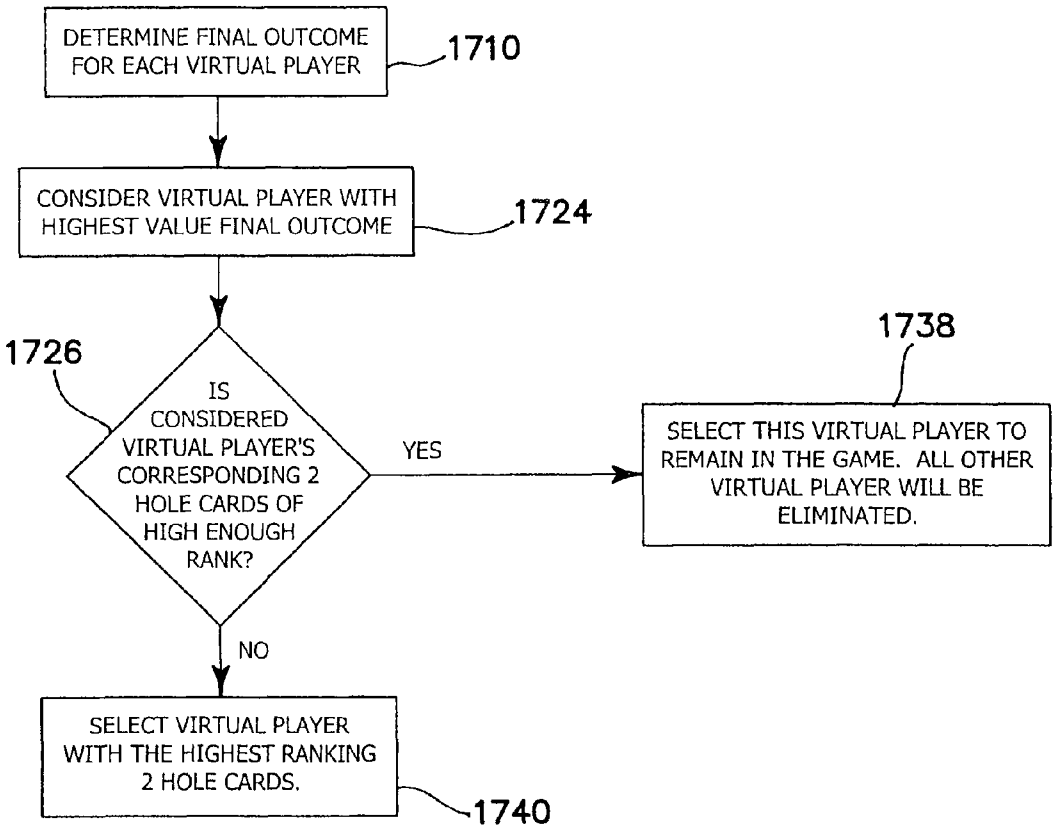
FIG. 17 shows a flow chart detailing a methodology for selecting one of two virtual players to eliminate.
Figure 18:
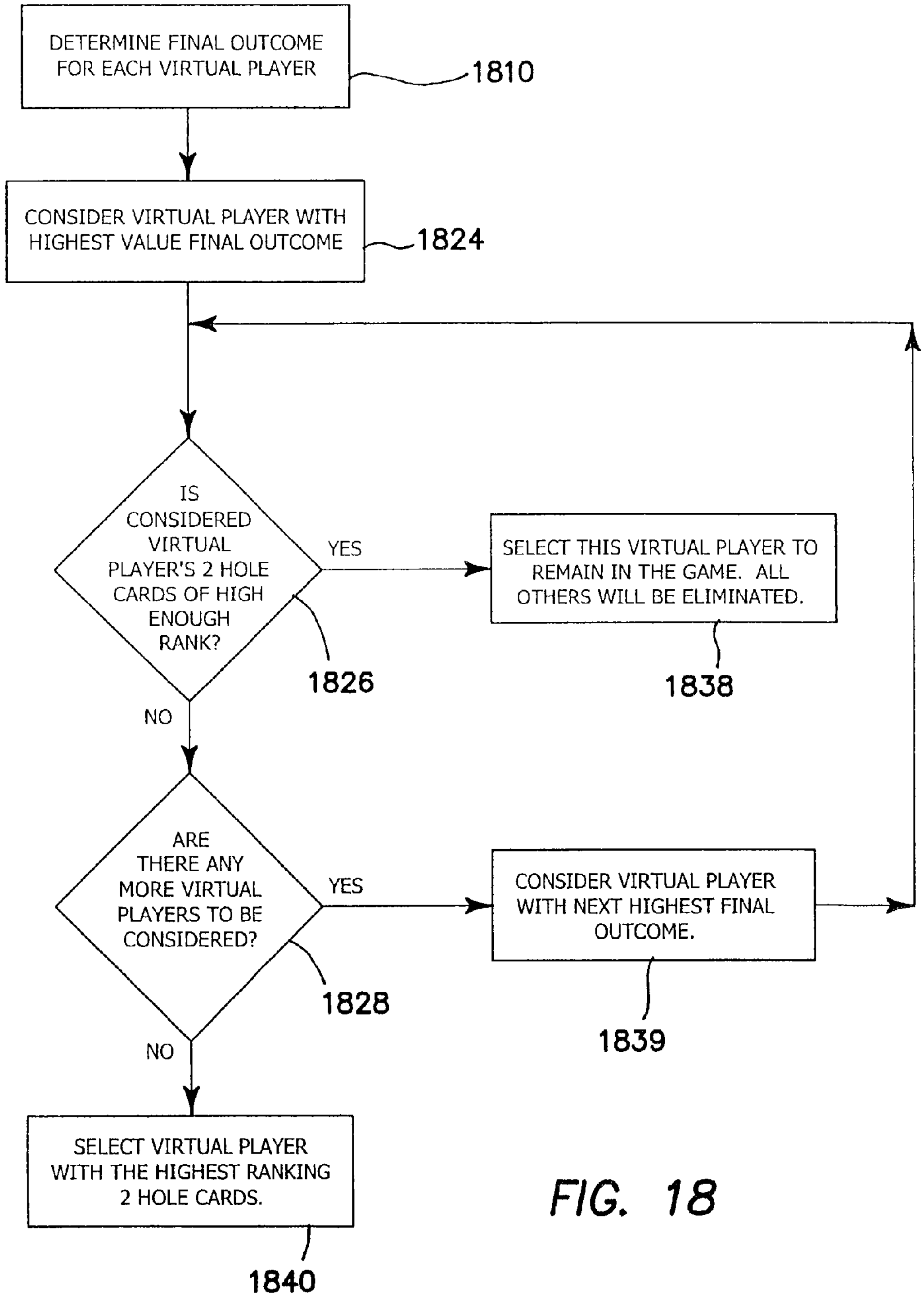
FIG. 18 shows a flow chart detailing a methodology for selecting one of three or more virtual players to eliminate.

In one embodiment of the present invention a pre-established methodology is used to determine which one of the two virtual players and corresponding hand is selected for elimination from the game. FIGS. 17 and 18 show flow charts of example methodologies.

In another embodiment, one or more of the virtual players match and/or raise player wagers to enhance the pot. In such an embodiment, pre-established criteria determine whether a virtual player places a matching and/or raised wager. In a first example, in a game having two virtual players if a first virtual player is selected for elimination the first player always folds while the second virtual player always calls and raises the player's blind wager. Alternatively, if the second virtual player is selected for elimination, the first player either calls a first wager and then folds the next time it has a wagering requirement or it folds before calling the wager. The virtual players may also play (i.e., wager or fold) accordingly to a completely random formulation. Such scenarios create a more realistic game for the player. The wagering patterns of the virtual players may also be programmed such that the final pot is to be large or small. This variation in play also makes it more difficult for players to play optimally thereby adding to the house's edge. FIGS. 11-16 show flow charts detailing various wagering schemes.

Figure 5:
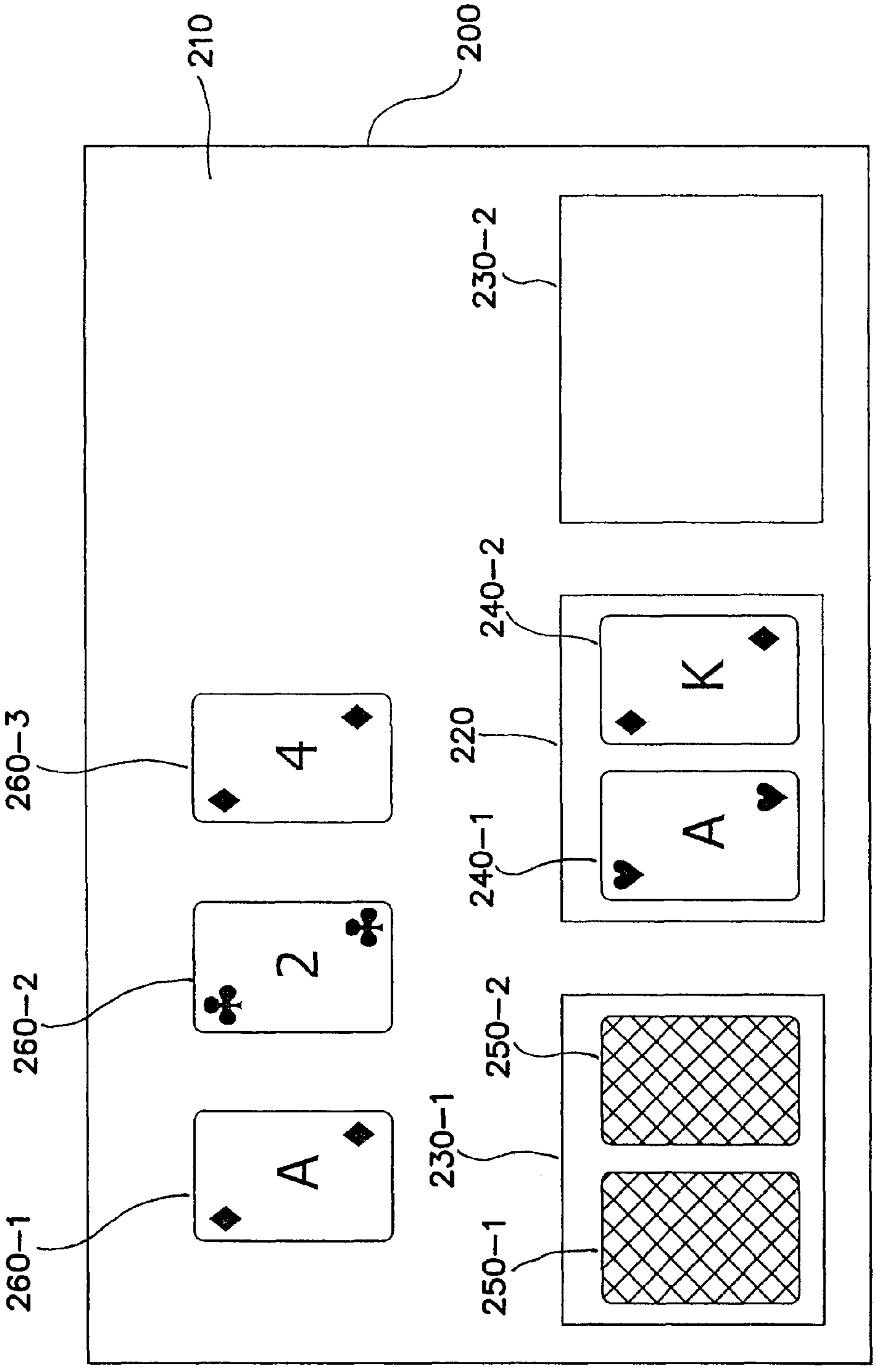
FIG. 5 shows a fourth screen shot of one embodiment of the present invention.
Figure 6:
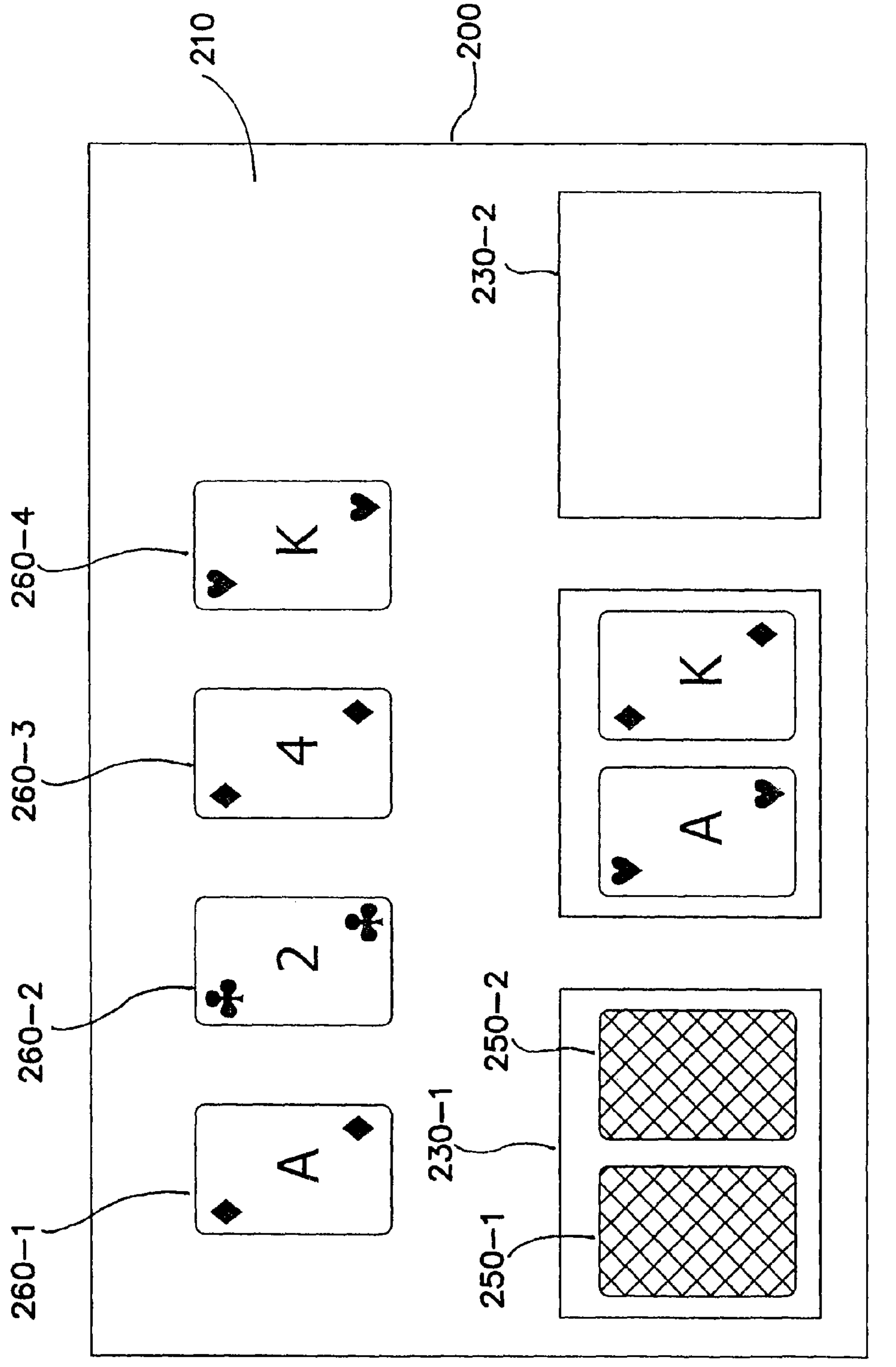
FIG. 6 shows a fifth screen shot of one embodiment of the present invention.
Figure 7:
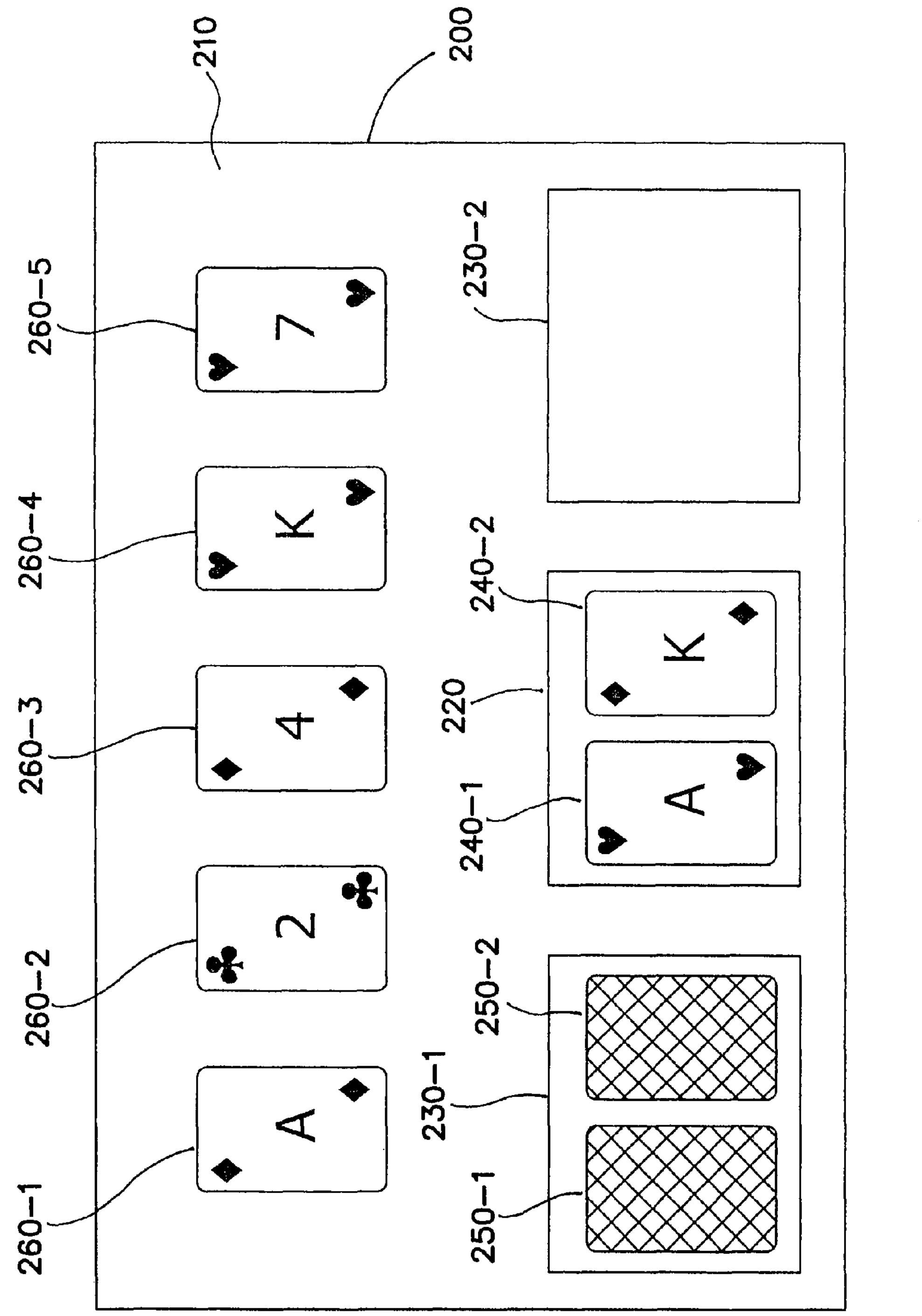
FIG. 7 shows a sixth screen shot of one embodiment of the present invention.
Figure 8:
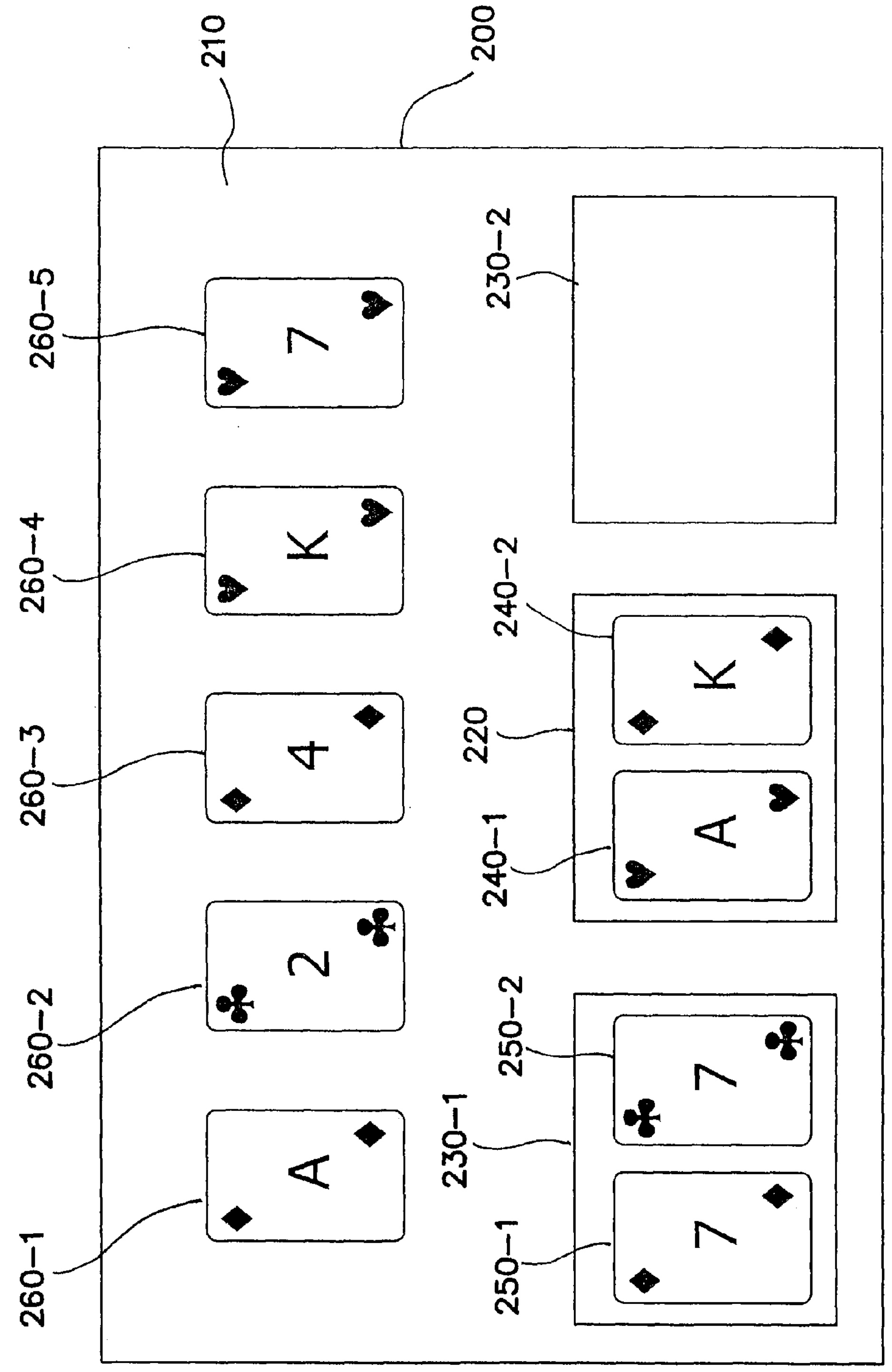
FIG. 8 shows a seventh screen shot of one embodiment of the present invention.

FIGS. 5-7 show the screen 200 as common cards 260-1 through 260-5 are provided and displayed. The player may be required to, or offered the option to, place one or more additional wagers, besides the blind wager, as the common cards 260-1 through 260-5 are dealt or provided and displayed. FIG. 8 shows the hole cards 250-1 and 250-2 of the remaining virtual hand in virtual position 230-1 being revealed. The Internet-based system or electronic gaming device, utilizing a processor or similar device, now compares the ranking of the player's best five-card poker hand against the ranking of each remaining virtual player's best five-card poker hand. Should the player's hand outrank all remaining virtual player hands, the player wins the pot or corresponding award. If a tie occurs, the player may win the entire pot or part of the pot, lose, or be paid a bonus. If the player's hand is outranked by any remaining virtual player hand, the player loses his blind wager and additional wagers placed during the game. As shown, the virtual player 230-1 wins the hand by holding three sevens against the player 220 holding two pair comprising Aces and Kings. Consequently, the player loses his blind wager and any subsequent wagers he may have placed.

It is also possible to implement a swap or exchange hand feature. FIG. 3 shows a swap hand icon 285 and exchange hand icon 295. The player can thus optionally switch his or her two hole cards 230-1 and 230-2 with the concealed hole cards 250-1 and 250-2 of a virtual hand. The swap feature may be offered at no charge or may require a player fee. If no fee is charged, other game rules may be altered to take into account the swap feature. That is, the player will always be discarding poor hole cards which more often than not would end up in a poor final hand likely having no award. Thus, rather than a fee, any game offering the free swap feature may involve more than one virtual player playing the game to its conclusion. With more virtual players participating in the game, the less likely the player is to hold the highest ranking final poker hand. Using the hand exchange icon 295, the player may elect to discard one or both of his hole cards 230-1 and 230-2 in exchange for one or two new cards from the deck. Certain game options, such as wagering options and requirements, may be altered in response to the player exchanging one or both of the player's hole cards.

Another optional feature is a side wager feature based on the ranking of the player's and/or one (or more) of the virtual player's final poker hand. A pay table 901, as shown in FIG. 9, lists game outcomes and corresponding payouts. The pay table may also include progressive awards. If the player's and/or one of the virtual player's hands are listed on the pay table, the player wins a corresponding award based on the side wager. There may also be a side wager premised on the player's hand tying one of the virtual player's hands. Such a wager may require a minimum hand ranking (e.g., three of a kind or better) to trigger a payout.

Figure 10:
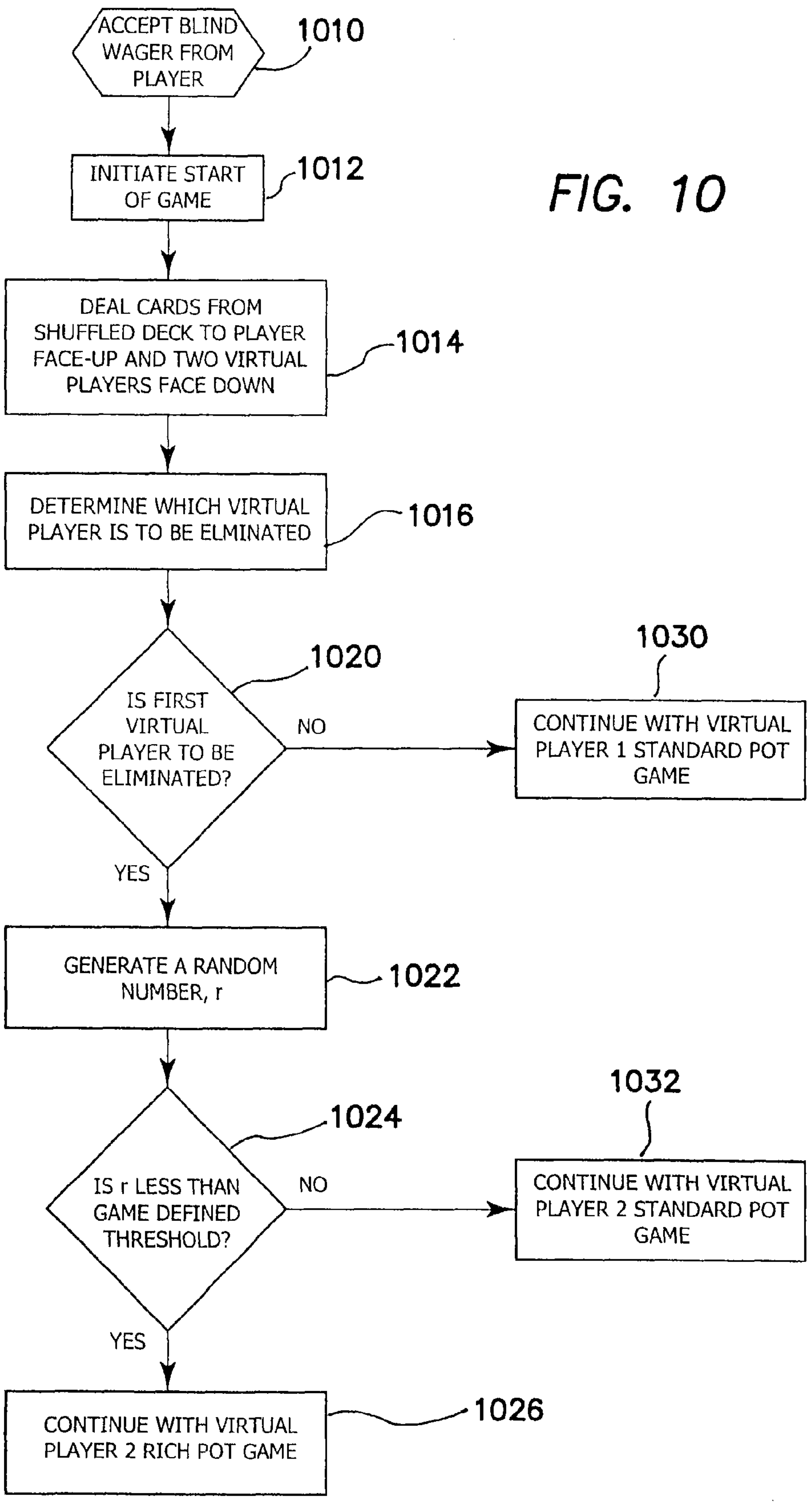
FIG. 10 shows a flow chart detailing a game type selection.

FIG. 10 shows a flow chart 1000 detailing another embodiment of the present invention including a method of determining the game type to be played. The chart 1000 shows acceptance of a player wager 1010 and the activation of the game 1012 which triggers two random, face-up, hole cards being provided to the player and two random, face-down hole cards being provided to both virtual players 1014. The virtual player to be eliminated is then decided 1016. See FIGS. 17 and 18 for more detail regarding the elimination decision or selection process. At step 1018, it is determined which virtual player is to be eliminated and then depending on which virtual player is to be eliminated 1020 the game proceeds accordingly. If the first player is not to be eliminated (i.e., the second player is to be eliminated), the game proceeds with the player and the first virtual player participating in a standard pot game 1030 (see FIG. 11 for standard pot game process). If the first player is to be eliminated, a random number, r, is generated 1022 and if the value of r is less than a game defined threshold 1024, the game proceeds with the player and the second virtual player participating in a rich pot game 1026 (see FIG. 13 for rich pot game process) and if r is greater than the threshold value the game proceeds with the player and the second virtual player participating in a standard pot game 1032 (see FIG. 12 for standard pot game process).

Figure 11:
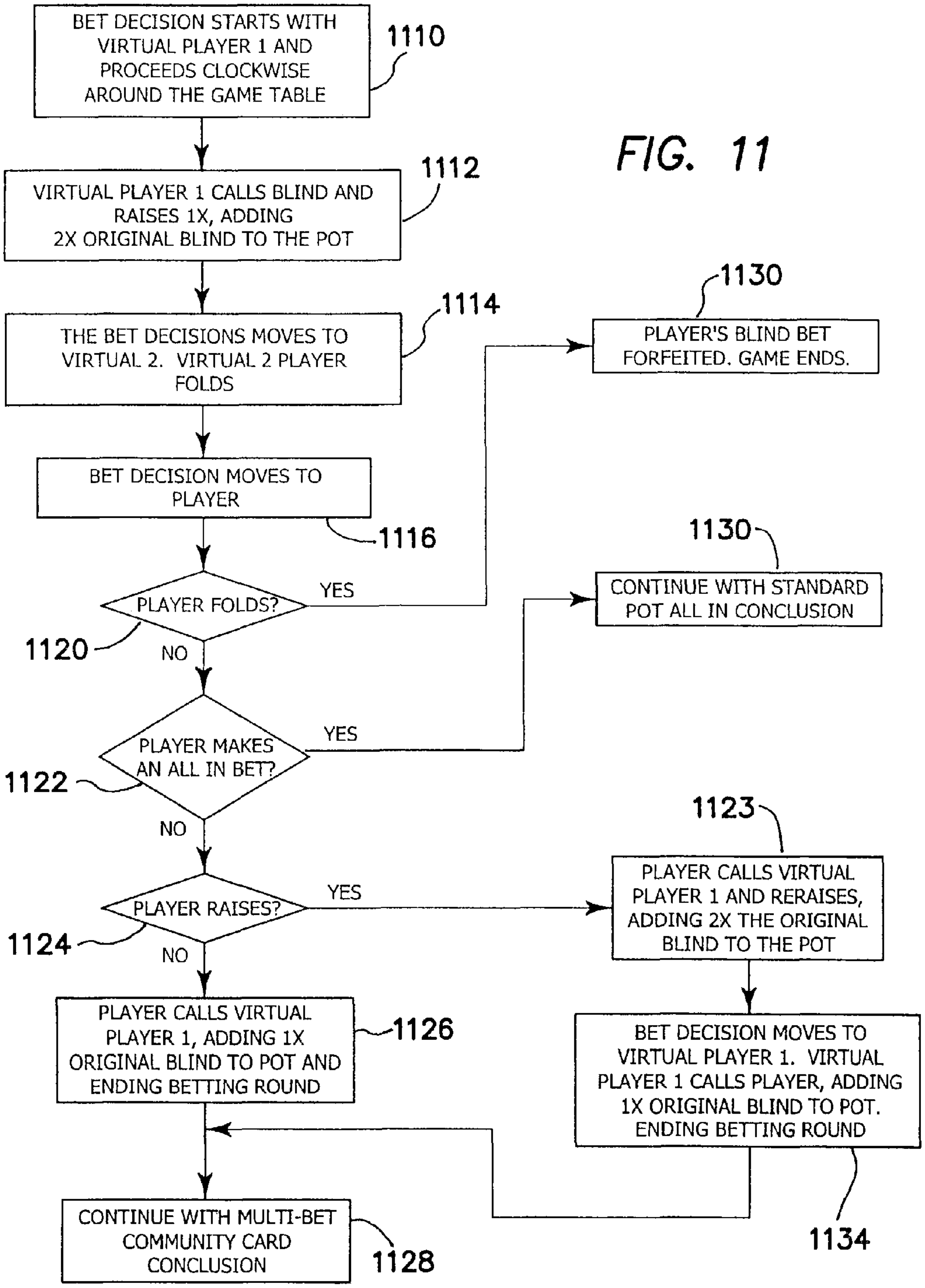
FIG. 11 shows a flow chart detailing a first virtual player standard pot game.

FIG. 11 shows a flow chart 1100 detailing a player and the first virtual player participating in a standard pot game as continued from FIG. 10. A bet or wager decision starts with the first virtual player 1110. The first virtual player calls the player's blind wager and raises it one unit (one unit being equivalent to the blind wager), thereby adding two total units to the original blind bet to the pot 1112. The bet decision moves to the second virtual player that, having been selected for elimination, folds 1114. The bet decision then moves to the player 1116. The player has several options. If the player folds, 1120, then he forfeits his blind bet and the game ends 1130. If the player decides to make an "ALL IN" bet 1122, the game proceeds with a standard pot "All In" game conclusion 1123 (see FIG. 15). If the player decides to raise, 1124, the player calls and raises the virtual player, thereby adding two units (twice his original blind) to the pot 1132. The bet decision moves back to the remaining first virtual player that calls the player's previous raise, adding one unit to the pot and ending the betting round. If the player opts to not raise at 1124, his only other option is to call the bet of the first virtual player, adding one unit to the pot and ending the betting round 1126. Once the betting round is concluded, without an "ALL IN" bet being made, the game proceeds to a multi-bet community card game conclusion 1128 (see FIG. 14.)

Figure 12:
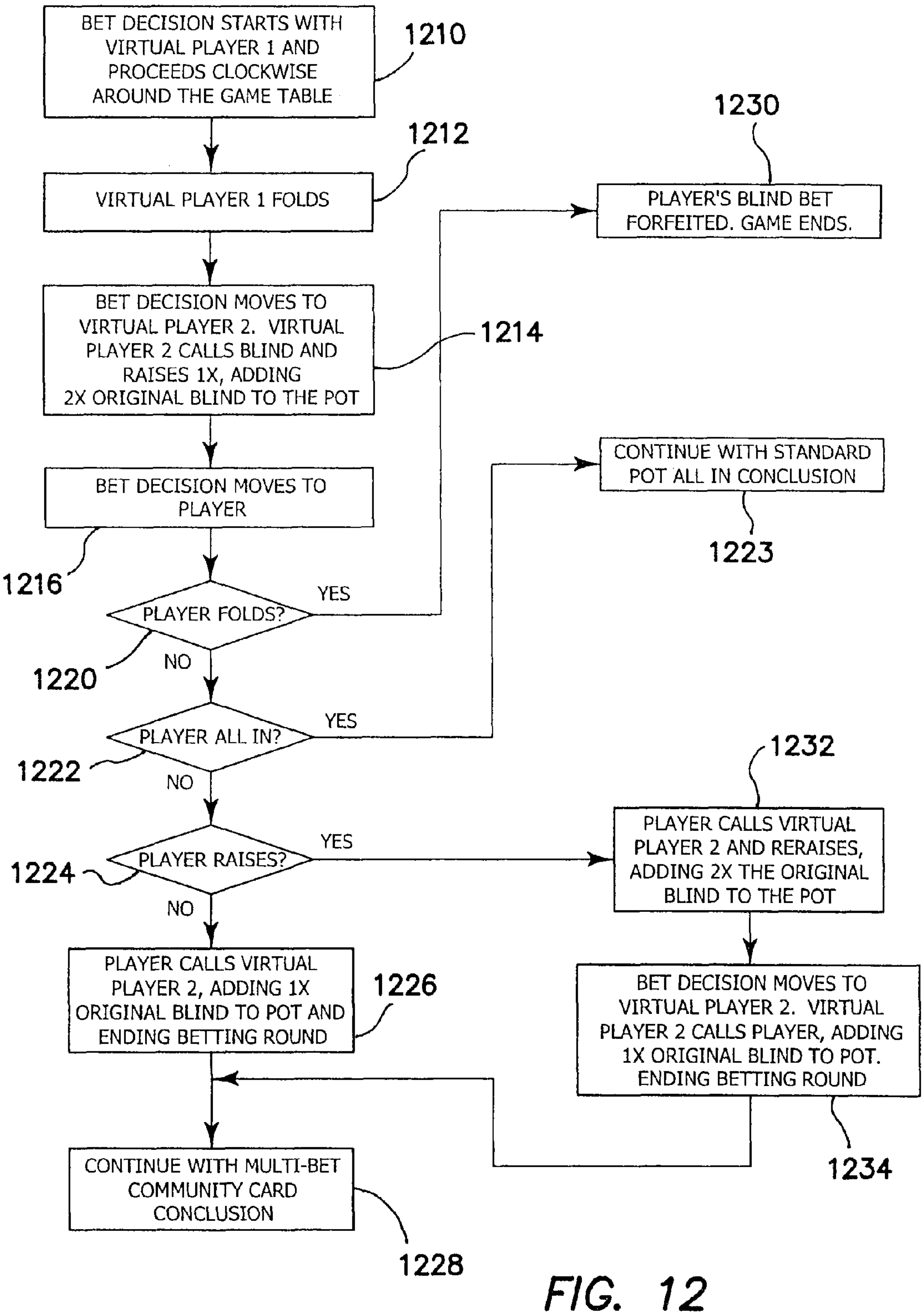
FIG. 12 shows a flow chart detailing a second virtual player standard pot game.

FIG. 12 shows a flow chart 1200 detailing a player and the second virtual player participating in a standard pot game as continued from FIG. 10. Chart 1200 is similar to chart 1100 with the notable exceptions that the first virtual player folds 1212 and the second virtual player calls and raises 1214. A bet or wager decision starts with the first virtual player 1210. The first virtual player, having been selected for elimination, folds 1212. The bet decision then moves to the second virtual player that calls the player's blind wager and raises it one unit, thereby adding two total units to the original blind bet to the pot 1214. The bet decision then moves to the player 1216. The player has several options. If the player folds, 1220, then he forfeits his blind bet and the game ends 1230. If the player decides to make an "ALL IN" bet 1222, the game proceeds with a standard pot "All In" game conclusion 1223. If the player decides to raise, 1224, the player calls and raises the virtual player, thereby adding two units (twice his original blind) to the pot 1232. The bet decision moves back to the remaining second virtual player that calls the player's previous raise, adding one unit to the pot and ending the betting round. If the player opts to not raise at 1224, his only other option is to call the bet of the second virtual player, adding one unit to the pot and ending the betting round 1226. Once the betting round is concluded, without an "ALL IN" bet being made, the game proceeds to a multi-bet community card game conclusion 1228.

Figure 13:
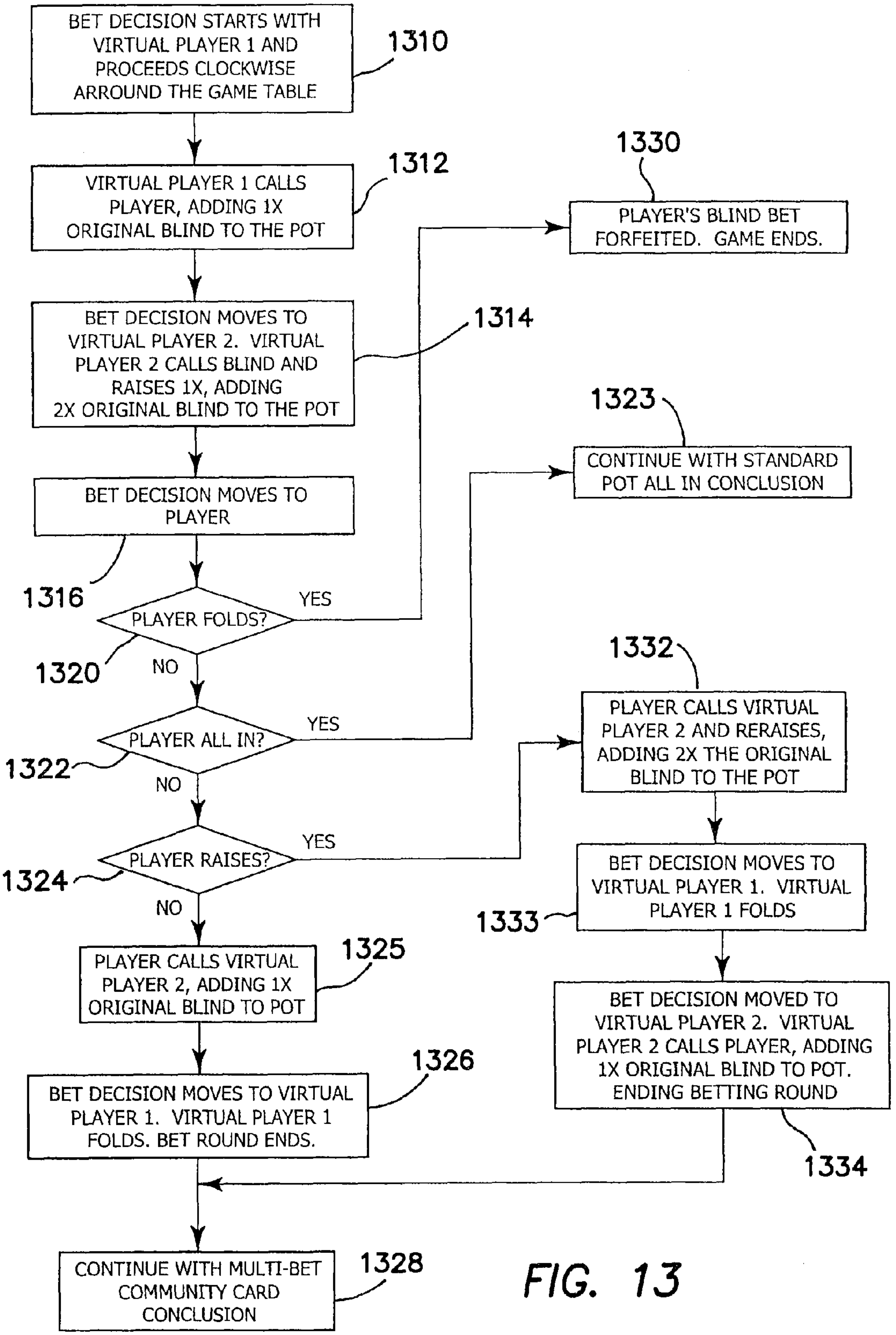
FIG. 13 shows a flow chart detailing a second virtual player rich pot game.

FIG. 13 shows a flow chart 1300 detailing a player and the second virtual player participating in a rich pot game as continued from FIG. 10. Chart 1300 is similar to chart 1200 with the notable exceptions that the first virtual player initially calls the player's blind wager 1312 and then folds when offered a second bet opportunity 1326 or 1333. A bet or wager decision starts with the first virtual player 1310. The first virtual player calls the blind wager 1312 thereby adding one unit to the pot. The bet decision then moves to the second virtual player that calls the player's blind wager and raises it one unit, thereby adding two total units to the original blind bet to the pot 1314. The bet decision then moves to the player 1316. The player has several options. If the player folds, 1320, then he forfeits his blind bet and the game ends 1330. If the player decides to make an "ALL IN" bet 1322, the game proceeds with a standard pot "All In" game conclusion 1323. If the player decides to raise, 1324, the player calls and raises the virtual player, thereby adding two units (twice his original blind) to the pot 1332. The bet decision then moves to the first virtual player that, having been selected for elimination, folds 1333. The bet decision then moves back to the remaining second virtual player that calls the player's previous raise, adding one unit to the pot and ending the betting round. If the player opts to not raise at 1324, his only other option is to call the bet of the second virtual player, adding one unit to the pot. Then the betting decision moves to the first virtual player that, having been selected for elimination, folds 1326. Once the betting round is completed, without an "ALL IN" bet being made, the game proceeds to a multi-bet community card game conclusion 1328.

Figure 14:
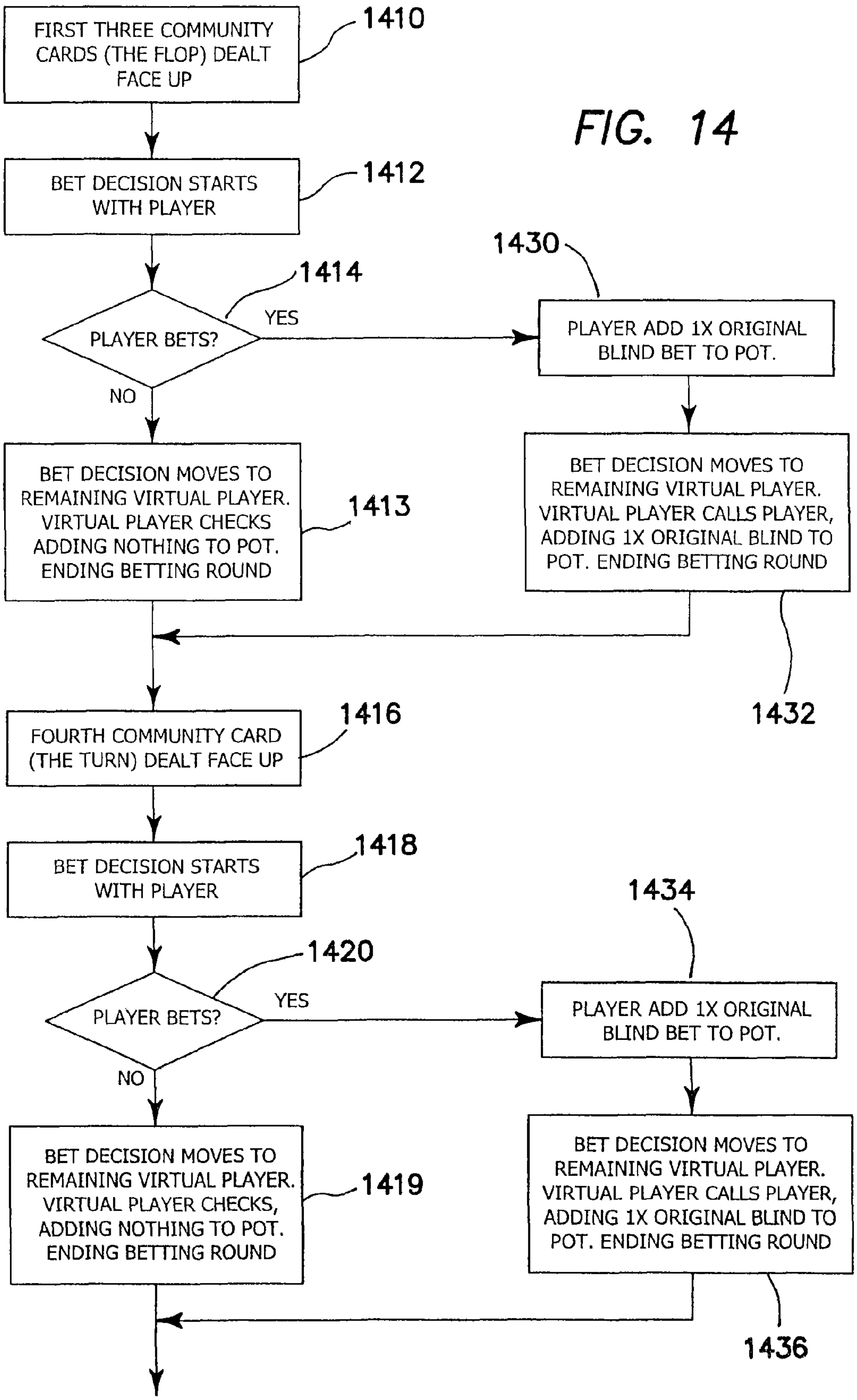
FIG. 14 shows a flow chart detailing a multi-bet community card game conclusion.
Figure 14:
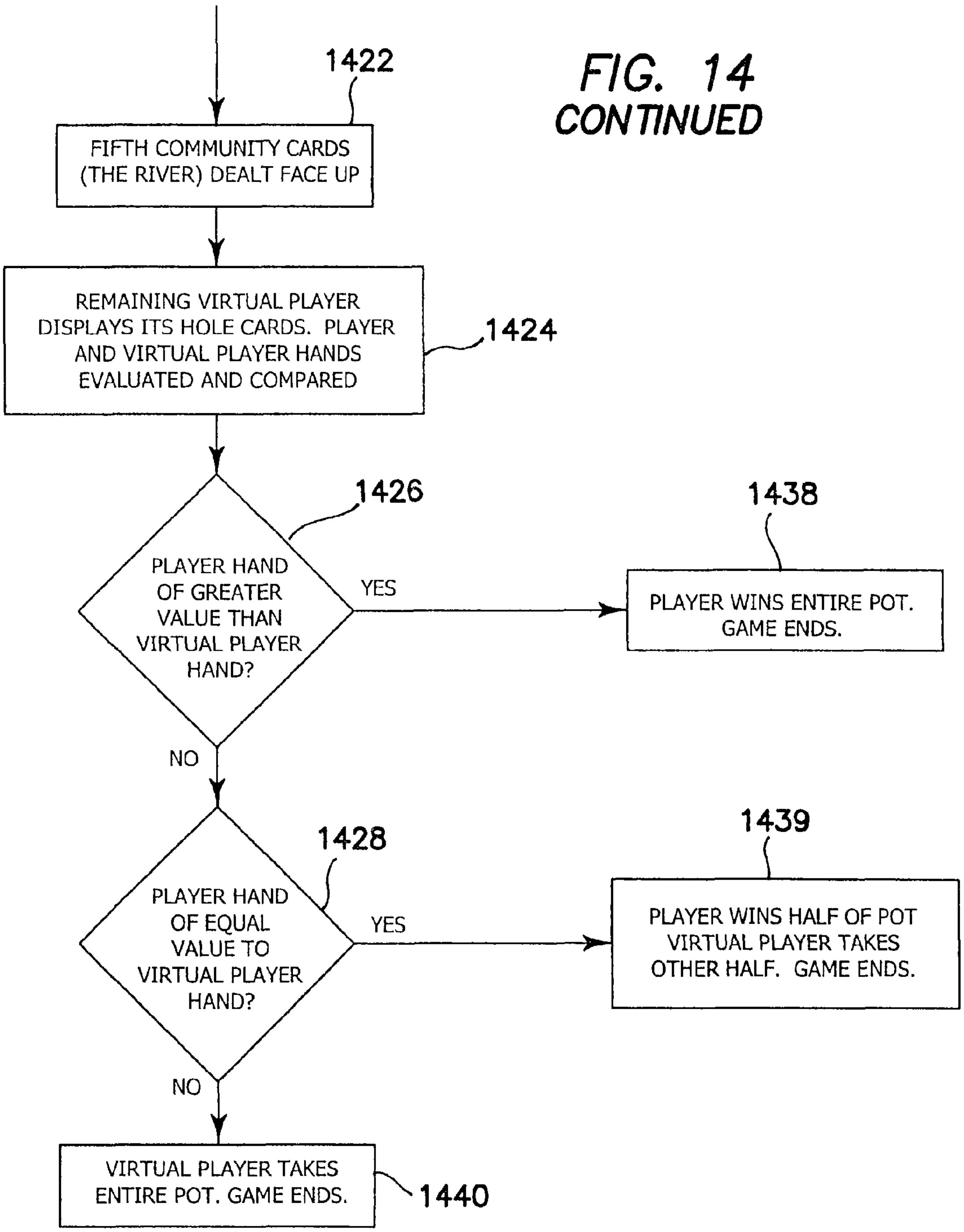

FIG. 14 shows a flow chart 1400 detailing the multi-bet community card game conclusion as continued from FIGS. 11-13. The first three community cards, the flop, are provided face up 1410 and the bet decision, as in Texas Hold'em, starts with the player 1412. The player is given the option to either bet or check 1414. If the player bets 1430, the player is required to add one unit to the pot which the remaining virtual player matches by likewise adding one unit the pot 1432. If the player elects to check (i.e., not bet), the remaining virtual player does the same 1415. A similar betting round with same bet options occurs after the fourth community card, the turn, is provided face up 1416. That is, the bet decision moves to the player 1418 and the player is given the option to either bet or check 1420. If the player bets 1434, the player is required to add one unit to the pot which the remaining virtual player matches by likewise adding one unit the pot 1436. If the player elects to check (i.e., not bet), the remaining virtual player does the same 1419. After the fifth community card is provided face up 1422 the hole cards of the remaining virtual player are revealed and the two hands are evaluated and compared 1424. If the player's hand outranks the hand of the virtual player 1426 the player wins the entire pot 1438. If the player's hand is of an equal rank to the hand of the virtual player 1428, the player wins half the pot 1439 and if the virtual player's hand outranks the player's hand, the player wins nothing 1440 and loses his bets.

Figure 15:
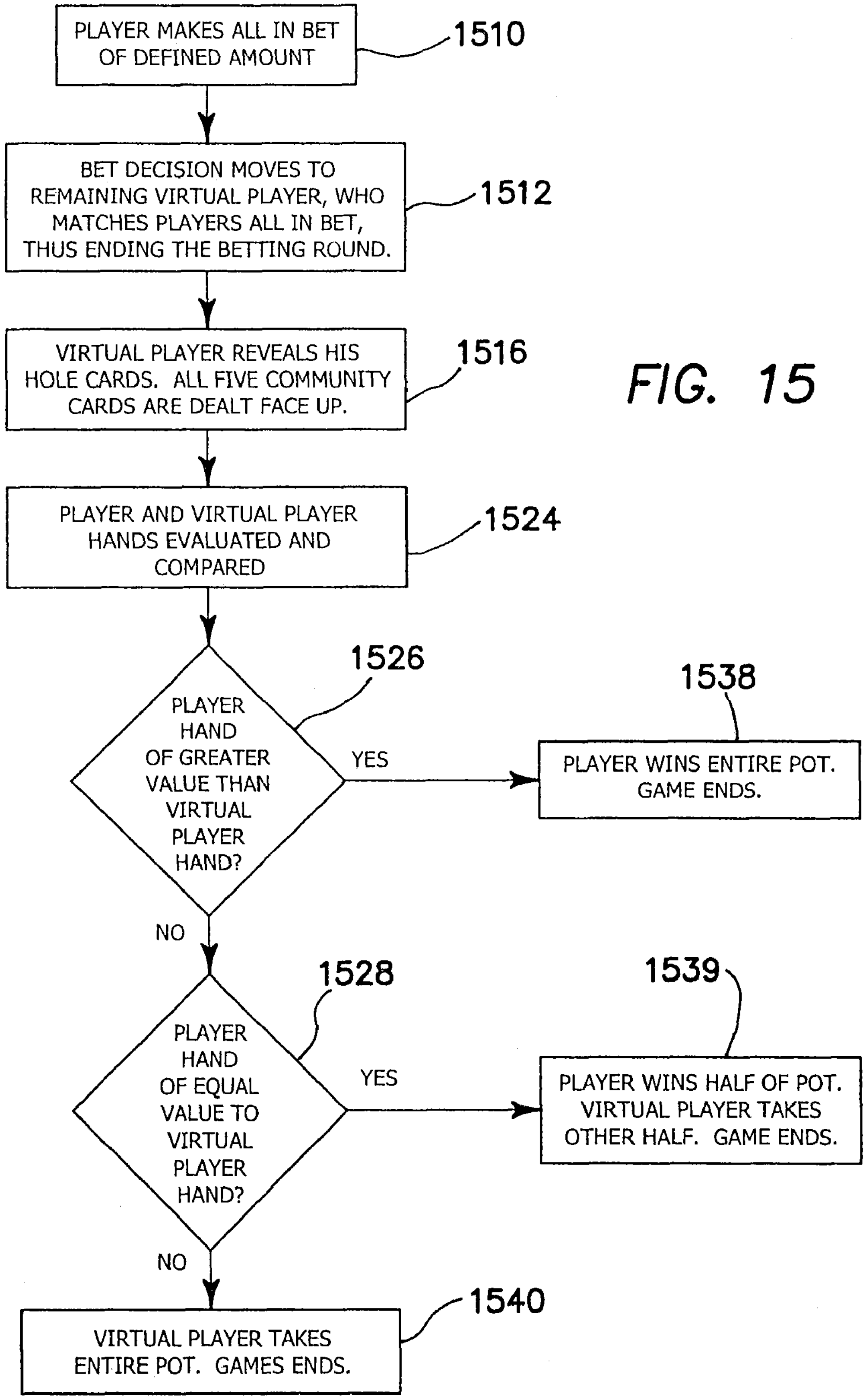
FIG. 15 shows a flow chart detailing a standard "All In" pot game conclusion.

FIG. 15 shows a flow chart 1500 detailing the continuation of the game from FIGS. 11 and 12 wherein the player selected to make an "All In" bet in a standard pot game. The "All In" option requires the player to make a bet of a certain amount (e.g., eight times the blind bet amount) relative to his original blind bet 1510. The bet decision moves to the remaining virtual player that matches the players "All In" bet 1512. The virtual player's hole cards are then revealed and then all five community cards are dealt face up 1516. Player and virtual player hands are evaluated and compared 1524. If the player's hand outranks the hand of the virtual player 1526 the player wins the entire pot 1538. If the player's hand is of an equal rank to the hand of the virtual player 1528, the player wins half the pot 1539 and if the virtual player's hand outranks the player's hand, the player wins nothing 1540 and loses his bets.

Figure 16:
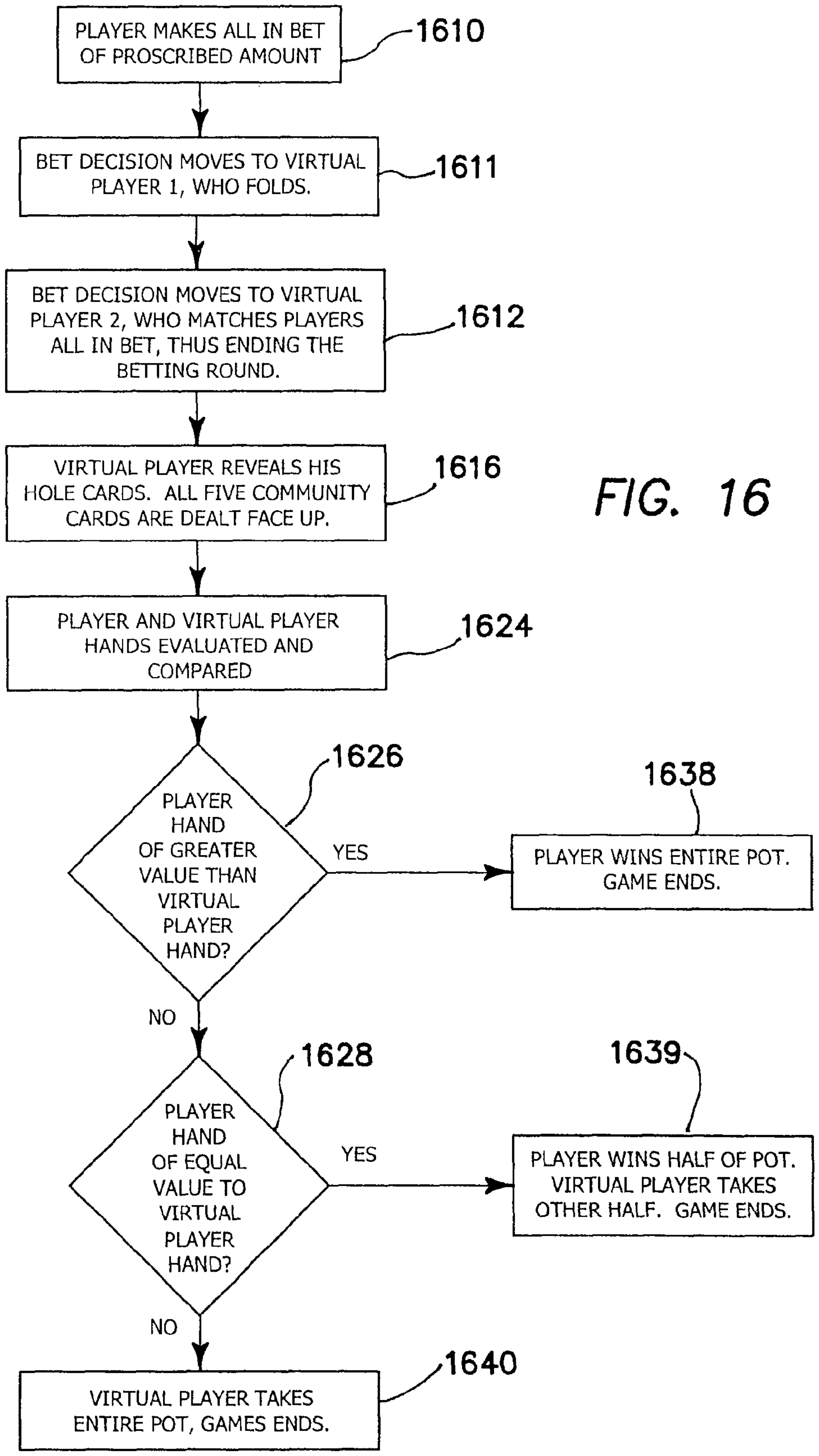
FIG. 16 shows a flow chart detailing a rich "All In" pot game conclusion.

FIG. 16 shows a flow chart detailing the continuation of the game from FIG. 13 wherein the player selected to make an "All In" bet in the rich pot game. The "All in" option requires the player to make a bet of a certain amount (e.g., eight times the blind bet amount) relative to his original blind bet 1610. The bet decision moves to the first virtual player that, having been selected for elimination, folds 1611. The bet decision then moves to the remaining virtual player that matches the players "All In" bet 1612. The virtual player's hole cards are then revealed and then all five community cards are dealt face up 1616. Player and virtual player hands are evaluated and compared 1624. If the player's hand outranks the hand of the virtual player 1626 the player wins the entire pot 1638. If the player's hand is of an equal rank to the hand of the virtual player 1628, the player wins half the pot 1639 and if the virtual player's hand outranks the player's hand, the player wins nothing 1640 and loses his bets.

FIG. 17 shows a flow chart 1700 detailing one methodology for determining which one of two virtual players is selected for elimination. After initially determining the final outcome for each virtual player 1710, the virtual player that would finish with the highest-ranking final hand is considered 1724. A processor, computer or similar device determines which virtual player hand would be the highest ranking if it remained in the hand to conclusion. The order, rank and suits of the community cards are known to the processor at this time so the determination is straight-forward. In the case whereby both virtual players would have the same final hand ranking, one of the two players is randomly selected for elimination. If the virtual player that is being considered at 1724 holds two hole cards of a sufficient enough high rank relative to a pre-established ordered list of two card hand rankings 1726, the virtual player being considered is selected to remain in the game and the other virtual player is selected to be eliminated 1738. Otherwise, the virtual player holding the highest two hole card ranking is selected to remain in the game and the other virtual player is selected to be eliminated 1740.

FIG. 18 shows a flow chart 1800 detailing another methodology for determining which of three or more virtual players is selected for elimination. The chart 1800 is similar to chart 1700, except that there is additional logic to support the case of three or more virtual players. After initially determining the final outcome for each virtual player 1810, the virtual player that would finish with the highest-ranking final hand is considered 1824. If the virtual player that is being considered at 1824 holds two hole cards of a sufficient enough high rank relative to a pre-established ordered list of two card hand rankings 1826, the virtual player being considered is selected to remain in the game and all other virtual players are selected to be eliminated 1838. Otherwise, if there are any other virtual players which have not been similarly considered 1828, the consideration step is repeated with the virtual player that would hold the next highest final hand ranking 1839. If no virtual player holds two hole cards of sufficient enough high rank relative to the ordered list of two card hand rankings, the virtual player with the highest ranking two hole cards is selected to remain in the game and all other virtual players are selected to be eliminated 1840.

FIG. 19 shows a listing 1900 of two-card poker rankings from highest rank 1901 to lowest rank 1999.

Although the invention has been described in detail with reference to several embodiments, additional variations and modifications exist within the scope and spirit of the invention as described and defined in the following claims.

We claim:

1. A method of controlling an electronic gaming system, the electronic gaming system having a display device and a processor operatively coupled to the display device and configured to display a card game, the method comprising:

executing a plurality of computer-readable instructions by the processor, the execution resulting in, for each and every play of the card game:

performance of a plurality of steps for said play of the card game regardless of the cards dealt to each of a live player and two or more virtual players, the steps including:

(a) accepting a player wager in the form of a blind wager;

(b) dealing and displaying to the live player two hole cards to form a live player hand; and (c) dealing and displaying to each of the two or more virtual players a virtual player hand, wherein all game play decisions for each of the virtual players are made by the processor;

(d) offering the live player an option to place a subsequent wager;

(e) after the live player elects whether or not to place the subsequent wager, (i) requiring at least one of the virtual players to fold, and (ii) requiring at least a different one of the virtual players to either call or raise the blind wager and any subsequent wager by the live player, the determination of which virtual player to fold being based on pre-established criteria and in response to the play decisions controlled by the processor;

(f) after the at least one virtual player folds and is eliminated from the play of the card game:

(i) causing the display device to display five face-up common cards; and (ii) offering the live player an option to place one or more subsequent wagers in a pre-established manner;

(g) causing the display device to display the live player's final hand by the display device;

(h) comparing the live player's final hand against each remaining virtual player's hand, wherein the hands are formed using the best five cards selected from the two hole cards and the five common cards; and (i) paying the live player an award based on the rank of the live player's final poker hand.

2. The method of claim 1 further comprising requiring the live player to place at least one subsequent wager after the blind wager in order to remain in the game.

3. The method of claim 1 further comprising comparing each of the virtual player hands and folding the virtual player hand having the weakest hole cards.

4. The method of claim 1 further comprising comparing each of the virtual player hands and folding the virtual player hand having the weakest final five card hand.

5. The method of claim 1 further comprising providing an option for the live player to swap, at some point during the game, hands with one of the virtual players.

6. The method of claim 5 further comprising altering subsequent wagering opportunities and/or requirements if the live player swaps hands with one of the virtual players.

7. The method of claim 1 further comprising providing an option for the live player to discard one or both of the live player's hole cards in exchange for one or two new cards.

8. The method of claim 7 further comprising altering subsequent wagering opportunities and/or requirements if the live player discards one or both of the live player's hole cards.

9. The method of claim 1 further comprising offering an optional side wager to the live player based on the strength of the ranking of the live player's final hand and/or one of the remaining virtual player's hand.

10. A method of controlling an electronic gaming system, the electronic gaming system having a display device and a processor operatively coupled to the display device and configured to display a card game, the method comprising:

executing a plurality of computer-readable instructions by said processor, the execution resulting in, for each and every play of the card game:

performance of a plurality of steps for each said play of the card game regardless of the cards dealt to each of a live player and two or more virtual players, the steps including:

(a) accepting a player wager in the form of a blind wager;

(b) dealing and displaying to the live player two hole cards to form a live player hand; and (c) dealing and displaying to each of the two or more virtual players a different virtual player hand, wherein all game play decisions for each of the virtual players are made by the processor;

(d) offering the live player an option of discarding one or both of the live player's hole cards in exchange for replacement cards;

(e) providing five face-up common cards in a pre-established manner;

(f) after the live player elects whether to accept the option, requiring at least one of the virtual players to fold and eliminating the at least one virtual player from the play of the card game;

(g) causing the display device to display the live player's final hand;

(h) comparing the live player's final hand against each remaining virtual player's hand, wherein the hands are formed using the best five cards selected from the two hole cards and the five common cards; and (i) paying the live player an award based on the strength of the live player's final poker hand.

11. The method of claim 10 further comprising altering subsequent wagering opportunities and/or requirements in response to the live player electing to discard one or both of the player's hole cards.

12. The method of claim 10 further comprising requiring folding of at least one of the virtual players in response to the live player placing a subsequent wager, and requiring at least a different one of the virtual players to either call or raise the blind wager and any subsequent wager by the live player, the determination of which virtual player to fold being based on pre-established game criteria.

13. The method of claim 10 further comprising offering an optional side wager to the live player based on the strength of the ranking of the live player's and/or one of the virtual player's final hand.

14. A method of controlling an electronic gaming device, the electronic gaming device having a display device and a processor operatively coupled to the display device and configured to display a card game, the method comprising:

executing a plurality of computer-readable instructions by the processor, the execution resulting in, for each and every play of the card game:

performance of a plurality of steps for said play of the card game regardless of the cards dealt to each of a live player and two or more virtual players, the steps including:

(a) accepting a player wager in the form of a blind wager;

(b) dealing and displaying to the live player two hole cards to form a live player hand; and (c) dealing and displaying to each of the two or more virtual players a different virtual player hand, wherein all game play decisions for each of the virtual players are made by the processor;

(d) offering the live player an option of discarding one or both of the live player's hole cards in exchange for one or two replacement hole cards;

(e) after the live player elects whether to accept the option of discarding one or both of the live player's hole cards, (i) requiring at least one of the virtual players to fold and eliminating the at least one of the virtual players from the play of the card game, and (ii) requiring at least a different one of the virtual players to either call or raise the blind wager and any subsequent wager by the live player, the determination of which virtual player to fold is in response to the play decisions controlled by the at least one processor and based on pre-established game criteria;

(f) after the required at least one virtual player hand has been folded:

(i) causing the display device to display five face-up common cards; and (ii) offering the live player an option to place one or more subsequent wagers in a pre-established manner;

(f) comparing the live player's final hand against each remaining virtual player's hand, wherein the hands are formed using the best five cards selected from the two hole cards and the five common cards; and (g) paying the live player any awards based on the strength of the live player's final poker hand.

15. The method of claim 14 further comprising offering an optional side wager based on the strength of the ranking of the live player's and/or one of the virtual player's final hand.

16. The method of claim 14 further comprising altering subsequent wagering opportunities and/or requirements in response to said live player electing to discard one or both of the player's hole cards.

17. A method of controlling an electronic gaming device, the electronic gaming device having a display device and a processor operatively coupled to the display device and configured to display a card game, the method comprising:

executing a plurality of computer-readable instructions by said processor, the execution resulting in, for each and every play of the card game:

performance of a plurality of steps for each said play of the card game regardless of the cards dealt to each of a live player and two or more virtual players, the steps including:

(a) accepting a player wager in the form of a blind wager;

(b) dealing and displaying to the live player two hole cards to form a live player hand; and (c) dealing and displaying to each of the two or more virtual players a different virtual player hand, wherein all game play decisions for each of the virtual players are made by the processor;

(c) requiring at least one of the virtual players match and raise the live player's blind wager;

(d) requiring the live player to match the raising virtual player's wager, else forfeit the game;

(e) after the live player matches the raising virtual player's wager, requiring at least one of the virtual player hands to be folded, other than the raising virtual player and folding said virtual player hand, the determination of which virtual player hand to fold is in response to the play decisions controlled by the at least one processor;

(f) after the virtual player hand has been folded:

(i) causing the display device to display five face-up common cards; and (ii) offering the live player an option to place one or more subsequent wagers in a pre-established manner;

(g) comparing the live player's final hand against each remaining virtual player's hand, wherein the hands are formed using the best five cards selected from the two hole cards and the five common cards; and (h) paying the live player an award based on the strength of the player's final poker hand.

18. The method of claim 17 further comprising denying optional subsequent wagers if a required post-blind wager is greater than a specific amount relative to the live player's blind wager.

19. The method of claim 17 further comprising selecting which virtual player to eliminate based upon the relative rank of each virtual player's two hole cards.

20. The method of claim 17 further comprising selecting which virtual player to eliminate based upon the relative rank of each virtual player's final hand.

21. The method of claim 17 further comprising selecting to remain in the game the virtual player with the highest-ranking final hand and hole cards above a two-card threshold ranking, otherwise if all virtual player's hole cards are below the two-card threshold ranking, selecting the virtual player to remain in the game based upon the relative rank of each virtual player's two hole cards and eliminating all other virtual players.

22. The method of claim 17 further comprising causing a virtual player which has been selected for elimination to initially call a live player's blind wager a first time the virtual player has the option to call the wager and then to fold a next time the virtual player.

23. A gaming system comprising:

a display device;

an input device;

a memory device which stores logic; and a processor operatively coupled to the display device, the input device and the memory device, the processor operable to display a card game and, for each and every play of the card game and regardless of the cards dealt to each of a live player and two or more virtual players:

(a) accept a wager from the live player in a form of a blind wager;

(b) start a game based on the wager;

(c) display two hole cards designated for each of: (i) the live player; and (ii) the two or more virtual players, the hole cards forming a live player hand and a plurality of virtual player hands, wherein all game play decisions for each of the virtual players are made by the processor;

(d) offer the live player an option to place a subsequent wager;

(e) after the live player elects whether or not to place the subsequent wager, (i) require at least one of the virtual players to be folded and eliminating the virtual player from the play of the game, and (ii) require at least a different one of the virtual players to either call or raise the blind wager and any subsequent wager by the live player, the determination of which virtual player to fold being based on play decisions controlled by the processor;

(f) after the at least one virtual player hand has been folded:

(i) cause the display device to display five face-up common cards; and (ii) offer the live player an option to place one or more subsequent wagers in a pre-established manner;

(g) cause the display device to display and compare a final hand of the live player against a hand of each remaining one of the virtual players, said hands being formed using a best five cards selected from the two hole cards and the five common cards; and (h) pay the live player an award based on a rank of the live player's final poker hand.

24. The gaming system of claim 23, wherein each one of the virtual players is a computerized simulation of a live player.

25. The gaming system of claim 23, wherein the memory device stores logic executable by the processor to require the live player to place at least one subsequent wager after the blind wager in order to remain in the game.

26. The gaming system of claim 25, wherein the memory device stores logic executable by the processor to require elimination of at least one of the virtual players in response to the live player placing the subsequent wager.

27. The gaming system of claim 23, wherein the memory device stores logic executable by the processor to require elimination of the virtual player with a weakest set of hole cards.

28. The gaming system of claim 23, wherein the memory device stores logic executable by the processor to require elimination of the virtual player with a weakest final hand.

29. The gaming system of claim 23, wherein the memory device stores logic executable by the processor to provide an option for the live player to swap, at some point during the game, hands with at least one of the virtual players.

30. A gaming system comprising:

at least one input device;

at least one processor;

at least one display device; and at least one memory device storing a plurality of computer-readable instructions which, when executed by the at least one processor, cause the at least one processor to operate with the at least one display device and the at least one memory device to, display a card game and, for each and every play of the card game and regardless of the cards that each of a human player and a first and second computerized player are holding:

(a) receive a first input corresponding to a first wager provided by the human player;

(b) start a play of a poker game;

(c) cause the display device to display:

(i) a player area designated for the human player;

(ii) a first area designated for the first computerized player, the first computerized player being defined by a first set of the computer-readable instructions; and (iii) a second area designated for the second computerized player, the second computerized player being defined by a second set of the computer-readable instructions;

(d) cause the display device to display two facedown cards in the player area;

(e) cause the display device to display two facedown cards in the first area;

(f) cause the display device to display two facedown cards in the second area;

(g) receive a second input corresponding to a second wager provided by the human player;

(h) automatically cause a folding of one of the first and second computerized players to eliminate the computerized player from the play of the poker game, the automatic folding being a requirement for the play of the game;

(i) if the first computerized player is folded:

(w) indicate the folding of the first computerized player; and (x) cause the display device to display five face-up cards to the human player and the second computerized player; and (y) cause the display device to display and compare the cards of the human player to the cards of the second computerized player; and (z) provide an award to the human player depending upon the comparison; and (j) if the second computerized player is folded:

(w) indicate the folding of the second computerized player; and (x) cause the display device to display five face-up cards to the human player and the first computerized player; and (y) compare the cards of the human player to the cards of the first computerized player; and (z) provide an award to the human player depending upon the comparison.

31. The gaming system of claim 30, wherein the first wager includes an ante wager.

32. The gaming system of claim 30, wherein the at least one memory device stores a plurality of computer-readable instructions which, when executed by the at least one processor, cause the at least one processor to operate with the at least one display device and the at least one memory device to: (a) deactivate the first computerized player if the first computerized player is folded; and (b) deactivate the second computerized player if the second computerized player is folded.

33. The gaming system of claim 32, wherein the at least one memory device stores a plurality of computer-readable instructions which, when executed by the at least one processor, cause the at least one processor to operate with the at least one display device and the at least one memory device to continue the play of the poker game after one of the first and second computerized players is folded.

34. The gaming system of claim 30, wherein the at least one memory device stores a plurality of computer-readable instructions which, when executed by the at least one processor, cause the at least one processor to require the folding.

* * * * *

UNITED STATES PATENT AND TRADEMARK OFFICE

CERTIFICATE OF CORRECTION

PATENT NO. : 7,748,714 B2
APPLICATION NO. : 11/304516
DATED : July 6, 2010
INVENTOR(S) : Nicely et al.

It is certified that error appears in the above-identified patent and that said Letters Patent is hereby corrected as shown below:

IN THE CLAIMS:

In Claim 1, Column 9, Line 67, delete “and”.

In Claim 1, Column 10, Line 30, replace “the rank” with --a rank--.

In Claim 3, Column 10, Line 37, replace “the weakest hole cards” with --a weakest set of hole cards--.

In Claim 4, Column 10, Line 40, replace “the weakest” with --a weakest--.

In Claim 9, Column 10, Line 54, replace “the strength” with --a strength--.

In Claim 10, Column 11, Line 3, delete “and”.

In Claim 10, Column 11, Line 23, replace “the strength” with --a strength--.

In Claim 13, Column 11, Line 38, replace “the ranking” with --a ranking--.

In Claim 14, Column 11, Line 54, delete “and”.

In Claim 14, Column 12, Lines 19 and 20, replace “the strength” with --a strength--.

In Claim 15, Column 12, Line 22, replace “the ranking” with --a ranking--.

In Claim 17, Column 12, Line 42, delete “and”.

In Claim 17, Column 12, Line 47, replace “(c)” with --(d)--.

In Claim 17, Column 12, Line 49, replace “(d)” with --(e)--.

In Claim 17, Column 12, Line 51, replace “(e)” with --(f)--.

In Claim 17, Column 12, Line 58, replace “(f)” with --(g)--.

In Claim 17, Column 12, Line 64, replace “(g)” with --(h)--.

In Claim 17, Column 13, Line 1, replace “(h)” with --(i)--.

In Claim 17, Column 13, Line 1, replace “the strength” with --a strength--.

In Claim 19, Column 13, Line 8, replace “the relative rank” with --a relative rank--.

Signed and Sealed this

Nineteenth Day of October, 2010

David J. Kappos

David J. Kappos
*Director of the United States Patent and Trademark Office*

IN THE CLAIMS:

In Claim 20, Column 13, Line 11, replace “the relative rank” with --a relative rank--.

In Claim 21, Column 13, Line 14, replace “the highest-ranking” with --a highest-ranking--.

In Claim 21, Column 13, Line 18, replace “the relative rank” with --a relative rank--.

In Claim 22, Column 13, Line 25, after “player” insert --has the option to call.--.

In Claim 30, Column 14, Line 64, delete “and”.

In Claim 30, Column 14, Line 67, delete “and”.

In Claim 30, Column 15, Line 3, delete “and”.

In Claim 30, Column 15, Line 8, delete “and”.

In Claim 30, Column 15, Line 11, delete “and”.